United States Patent
Hwang et al.

(10) Patent No.: US 10,531,329 B2
(45) Date of Patent: Jan. 7, 2020

(54) METHOD AND APPARATUS FOR CONTROLLING RELAY TRAFFIC IN WIRELESS COMMUNICATION SYSTEM SUPPORTING D2D COMMUNICATION

(71) Applicant: Samsung Electronics Co., Ltd, Gyeonggi-do (KR)

(72) Inventors: June Hwang, Incheon (KR); Anil Agiwal, Suwon-si (KR); Hyun-Jeong Kang, Seoul (KR); Kyeong-In Jeong, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/566,636

(22) PCT Filed: Apr. 12, 2016

(86) PCT No.: PCT/KR2016/003857
§ 371 (c)(1),
(2) Date: Oct. 13, 2017

(87) PCT Pub. No.: WO2016/167550
PCT Pub. Date: Oct. 20, 2016

(65) Prior Publication Data
US 2018/0124633 A1    May 3, 2018

(30) Foreign Application Priority Data

Apr. 13, 2015  (IN) .............................. 415/KOL/2015
Aug. 11, 2015  (IN) .............................. 877/KOL/2015

(51) Int. Cl.
*H04W 28/02*    (2009.01)
*H04W 72/10*    (2009.01)
(Continued)

(52) U.S. Cl.
CPC ....... *H04W 28/0268* (2013.01); *H04W 72/10* (2013.01); *H04W 72/1247* (2013.01); *H04W 88/04* (2013.01)

(58) Field of Classification Search
CPC . H04W 28/0268; H04W 88/04; H04W 72/10; H04W 72/1247
(Continued)

(56) References Cited

U.S. PATENT DOCUMENTS 7,111,102 B2 *  9/2006  Doak .................... G06F 13/387
                                                          370/912
8,112,517 B2 *  2/2012  Takeshima .............. H04L 47/10
                                                          370/351
(Continued)

FOREIGN PATENT DOCUMENTS

WO    2015/016646 A1    2/2015

OTHER PUBLICATIONS

Samsung, "MAC PDU Addressing for Communication with UE-to-Network Relay", 3GPP TSG RAN WG2 Meeting #89bis, Apr. 20-24, 2015, 3 pages, R2-151206.
(Continued)

*Primary Examiner* — Faisal Choudhury

(57) ABSTRACT

The present disclosure relates to a 5G or pre-5G communication system for supporting a higher data rate beyond a 4G communication system such as LTE. A method for controlling relay traffic by a base station in a wireless communication system supporting device to device (D2D) communication according to an embodiment of the present invention comprises checking whether received traffic is relay traffic; if the received traffic is the relay traffic, identifying a port number in each cluster of the relay traffic; determining the priority of the relay traffic according to the
(Continued)

port number; and transmitting, to a relay terminal, a packet based on the determined priority.

4 Claims, 30 Drawing Sheets

(51) Int. Cl.
*H04W 72/12* (2009.01)
*H04W 88/04* (2009.01)

(58) Field of Classification Search
USPC .......................................................... 370/235
See application file for complete search history.

(56) References Cited

U.S. PATENT DOCUMENTS

| | | | | |
|---|---|---|---|---|
| 2008/0095181 | A1* | 4/2008 | Suetsugu | H04L 45/00 370/412 |
| 2015/0009930 | A1* | 1/2015 | Rapaport | H04L 1/1825 370/329 |
| 2015/0023185 | A1 | 1/2015 | Bodas et al. | |
| 2015/0071059 | A1* | 3/2015 | Fu | H04W 72/08 370/230 |
| 2016/0112084 | A1* | 4/2016 | Parron | H04B 1/3816 455/558 |
| 2016/0143078 | A1 | 5/2016 | Jeong | |
| 2018/0048986 | A1* | 2/2018 | Adachi | H04W 8/00 |
| 2018/0054755 | A1* | 2/2018 | Lee | H04W 72/1284 |
| 2018/0092017 | A1* | 3/2018 | Freda | H04W 76/14 |
| 2018/0279120 | A1* | 9/2018 | Lehtovirta | H04L 63/061 |

OTHER PUBLICATIONS

Samsung, "Issues to support UE2NW relay UE in D2D communication", 3GPP TSG-RAN WG2 #89bis, Apr. 20-24, 2015, 5 pages, R2-151290.

NEC, "Possible scenarios on UE-to-NW Relay", 3GPP TSG-RAN WG2#89bis, Apr. 20-24, 2015, 3 pages, R2-151426.

General Dynamics UK Ltd, Service continuity with the UE-to-network relay, 3GPP TSG-RAN2#89bis, Apr. 20-24, 2015, 5 pages, R2-151487.

International Search Report dated Aug. 31, 2016 in connection with International Patent Application No. PCT/KR2016/003857.

Written Opinion of the International Searching Authority dated Aug. 31, 2016 in connection with International Patent Application No. PCT/KR2016/003857.

* cited by examiner

METHOD AND APPARATUS FOR CONTROLLING RELAY TRAFFIC IN WIRELESS COMMUNICATION SYSTEM SUPPORTING D2D COMMUNICATION

CROSS-REFERENCE TO RELATED APPLICATIONS

This application is a National Phase Entry of PCT International Application No. PCT/KR2016/003857, which was filed on Apr. 12, 2016, and claims priority to Indian Patent Application No. 415/KOL/2015, filed on Apr. 13, 2015, and Indian Patent Application No. 877/KOL/2015, filed on Aug. 11, 2015, the contents of which are incorporated herein by reference.

TECHNICAL FIELD

The present disclosure relates to a method and apparatus for controlling relay traffic in a wireless communication system supporting a device to device (D2D) communication.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, due to the recent emergence of Internet of Things (IoT), a D2D communication technology has attracted more attention as one of communication methods for interworking with smart devices. The D2D communication technology works based on physical proximity between user equipments (UEs), and has many advantages in terms of network resource efficiency increase, UE power consumption reduction, cellular communication area expansion, and so forth. In line with this, the $3^{rd}$-Generation Partnership Project (3GPP) has selected the D2D technology as a study item in the Release 12 and has carried out feasibility study on the D2D technology in the name of the Proximity-based Service (PreSe) since 2011, and has launched standardization activities in earnest since 2013.

During D2D communication, a transmission D2D UE transmits data packets to a group of D2D UEs or broadcasts data packets to all D2D UEs. D2D communication between a transmitter and receiver(s) essentially corresponds to a non-connection. That is, before the transmitter starts transmission of data packets, there is no connection configuration between the transmitter and the receiver. During transmission, the transmitter inserts a source identification (ID) and a destination ID into the data packets. The source ID is set as a UE ID of the transmitter. The destination ID corresponds to a broadcast ID or a group ID of the receiver to receive the transmitted packet.

One of the D2D communication requirements is to make an out-of-coverage remote UE communicate with a network through another UE (that is, a network-relay or relay UE) that is within the network coverage and is close to the remote UE. The relay UE playing a relay role is referred to as a 'UE-to-Network relay'. Herein below, the relay UE and the 'UE-to-Network relay' will be used together. The remote UE communicates with a network-relay UE through D2D communication.

FIG. 1 illustrates an example of communication of a remote UE with a UE-to-Network relay by using D2D communication.

Referring to FIG. 1, a remote UE 100 communicates with a network through a UE-to-Network relay 110 and is a UE that is within a network coverage and intends to communicate with the network through the UE-to-Network relay 110.

D2D communication is performed between the remote UE 100 and the UE-to-Network relay 110, and cellular communication is performed between the UE-to-Network relay 110 and an evolved NodeB (eNB) 120.

The eNB 120 is connected to a public safety server (hereinafter, referred to as a "server") 140 through an evolved packet core (EPC) 130. The EPC 130 means a network system configured with an EPC, which is an Internet protocol (IP)-based packet switched (PS) core network and an access network such as LTE/Universal Terrestrial Radio Access Network (UTRAN), etc., and also means an evolving network of a Universal Mobile Telecommunication System (UMTS).

There is no mechanism for prioritizing or differentiating relay packets in comparison to non-relay packets on a radio link between the UE-to-Network relay 110 and the eNB 120. Relay traffic is intended for public safety. However, relay traffic generated in a relay UE may not be intended for public safety, or the relay UE may relay packets from remote UEs having different priorities. In this case, radio-level quality of service (QoS) differentiation is required.

SUMMARY

The present disclosure provides a method and apparatus for prioritizing or differentiating traffic packets by comparing the traffic packets with non-relay packets on a radio link between a relay UE and an eNB.

The present disclosure provides a method and apparatus for prioritizing relay traffic.

A method for controlling relay traffic by an eNB in a wireless communication system supporting D2D communication according to an embodiment of the present disclosure includes determining whether received traffic is relay traffic, identifying a port number in each cluster of the relay traffic, if determining that the received traffic is relay traffic, determining a priority of the relay traffic depending on the port number, and transmitting a packet reflecting the determined priority to a relay UE.

An apparatus for controlling relay traffic in an eNB in a wireless communication system supporting D2D communication according to an embodiment of the present disclosure includes a controller configured to determine whether received traffic is relay traffic, to identify a port number in each cluster of the relay traffic, if determining that the received traffic is relay traffic, and to determine a priority of the relay traffic depending on the port number and a transmitter configured to transmit a packet reflecting the determined priority to a relay UE.

A method for controlling relay traffic by a relay UE in a wireless communication system supporting D2D communication according to an embodiment of the present disclosure includes receiving a packet from an eNB, determining whether the packet is a D2D-related packet, and transmitting the packet to a UE supporting D2D if the packet is a D2D-related packet, in which a priority of the packet is determined depending on a port number.

An apparatus for controlling relay traffic in a relay UE in a wireless communication system supporting D2D communication according to an embodiment of the present disclosure includes a receiver configured to receive a packet from an eNB, a controller configured to determine whether the packet is a D2D-related packet, and a transmitter configured to transmit the packet to a UE supporting D2D if the packet is a D2D-related packet, in which a priority of the packet is determined depending on a port number.

DETAILED DESCRIPTION

Figure 1:
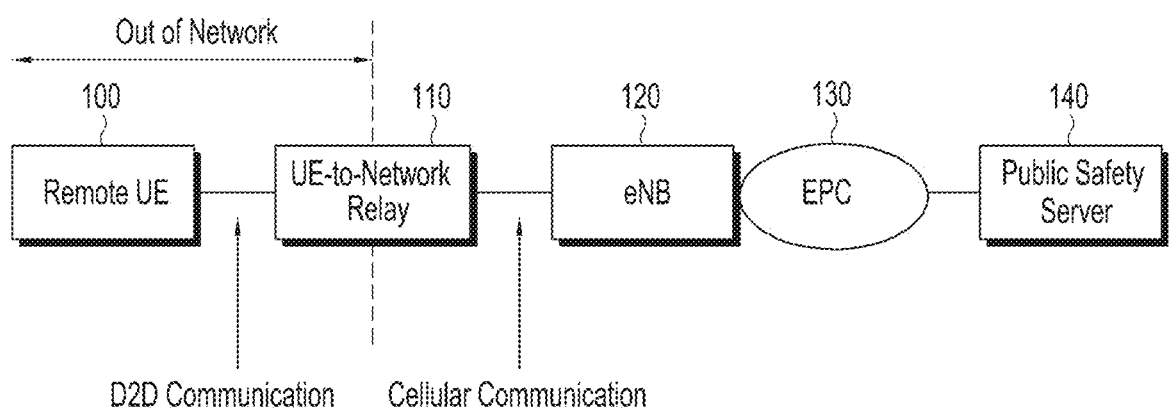
FIG. 1 illustrates an example of communication of a remote UE with a UE-to-Network relay by using D2D communication.

Various aspects will be described with reference to the drawings. In the following detailed illustration of the present disclosure, many particular details will be described to provide an integral description of the present disclosure. However, it would be apparent that these aspect(s) may be executed without the particular details.

As used herein, terms such as a "component", a "module", a "system", etc., are intended to include computer-related entities, e.g., such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. In addition, various aspects will be described herein in relation to a terminal that may be a wired terminal or a wireless terminal. The terminal may be referred to as a system, a device, a subscriber unit, a subscriber station, a mobile station, a mobile, a mobile device, a remote station, a remote terminal, an access terminal, a user terminal, a terminal, a communication device, a user agent, a user device, or a user equipment (UE). The wireless terminal may be a cellular phone, a satellite phone, a codeless phone, a session initiation protocol (SIP) phone, a wireless local loop (WLL) station, a personal digital assistant (PDA), a handheld device having wireless connection capability, a computing device, or other processing device connected to a wireless modem. Moreover, various aspects will be described herein in relation to a base station. The base station may be used to communicate with wireless terminal(s), and may also be called an access point, a node B, or other terms.

The term "or" is intended to mean an inclusive "or" rather than an exclusive "or". That is, unless specified otherwise, or clear from context, "X employs A or B" is intended to mean any of the natural inclusive permutations. That is, "X employs A or B" is satisfied under any of the foregoing instances: X employs A; X employs B; or X employs both A and B. In addition, the articles "a" and "an" as used in this application and the appended claims should generally be construed to mean "one or more" unless specified otherwise or clear from context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMO®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3 GPP). CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Traffic, data, and a packet used in the following description have the same meaning and will be used together.

The following technology will be used in various wireless communication systems. The following description will be based on 3GPP LTE and 3GPP LTE-A systems for clarity, but the technical spirit of the present disclosure is not limited thereto.

Terms used or related herein will be defined as below.
UMTS: a 3G mobile communication technology based on Global System for Mobile Communication (GSM), developed by the 3GPP.
Evolved Packet System (EPS): a network system including an IP-based PS core network, an EPC, and an access network such as LTE/UTRAN, etc. The EPS is a network of an evolved version of UMTS.
NodeB: a base station of GERAN/UTRAN. This is usually installed outside, and its coverage is a macro-cell scale.
eNodeB: a base station of E-UTRAN. This is usually installed outside, and its coverage is a macro-cell scale.
User Equipment (UE): a user device. The UE may also be referred to as a term such as a terminal, a mobile equipment (ME), a mobile station (MS), and so forth. The UE may also be a portable device such as a laptop computer, a cellular phone, a PDA a smart phone, a multimedia device, etc., or may be an unportable device such as a PC, a vehicle-mounted device, etc. In relation to machine type communication (MTC), the term, the UE or the terminal, may refer to an MTC device.
Mobility Management Entity (MME): an EPS network node which performs mobility management (MM) and session management (SM).
PDN-GW (Packet Data Network-Gateway)/PGW: a network node of an EPS network which performs UE IP address allocation, packet screening and filtering, charging data collection, and so forth.
SGW (Serving Gateway): an EPS network node which performs mobility anchoring, packet routing, idle mode packet buffering, triggering an MME to page a UE, etc.
Policy and Charging Rule Function (PCRF): an EPS network node which performs policy decision for dynamically applying quality of service (QoS) and charging policy discriminated per service flow.
Non-Access Stratum (NAS): a higher stratum of a control plane between a UE and an MME. This is a functional layer for signaling between a UE and a core network and exchanging a traffic message between the UE and core network in LTE/UMTS protocol stack and supports UE mobility and a session management procedure for establishing and maintaining IP connection between a UE and PDN GW.
ProSe: an access-based service using D2D communication proposed in the 3GPP, and a basic system configuration for providing ProSe may refer to 3GPP TS23.303.

Embodiments to be described below may be roughly divided into three embodiments.

A first embodiment of the present disclosure proposes a method for indicating a priority of a received relay packet to a relay UE.

A second embodiment of the present disclosure proposes a method for identifying a packet received by a server by using IP packet information such that each packet is directed to a proper remote UE without any information in a layer 1 and a layer 2.

A third embodiment of the present disclosure proposes a method for mapping a received packet to an EPS bearer.

Hereinbelow, with reference to the drawings, a description will be made of a method for controlling relay traffic in a wireless communication system supporting D2D communication according to an embodiment of the present disclosure.

(1) The first embodiment of the present disclosure proposes a method for indicating a priority of a received relay packet to a relay UE.

It is assumed that a higher layer (than the layer 2) provides priority information to a lower layer. If the relay UE is aware of a priority value of the received packet, the relay UE controls a QoS of the received packet through PC-5 at the time of end-to-end transaction. An end-to-end QoS of backward transaction, i.e., a QoS from a network to a remote UE may be controlled in the same manner.

A priority value is given from the remote UE to an AS in a higher layer per packet, each ProSe per packet priority value is statically fixed and mapped to each logic channel (and/or logic channel ID). This information may be fixed system information provided to all UEs in a cell. When UL traffic is transmitted to a relay UE from a remote UE, a received MAC PDU includes a logic channel ID in its header, and a D2D AS or a PDCP of the relay UE transmits this information (estimated by a logic channel in the received MAC PDU) to a higher layer of the relay UE. The higher layer is aware of in advance mapping information between a priority and a logic channel ID. The higher layer stores ProSe per packet priority and retains mapping between ProSe per packet priority and an EPS bearer ID or IP5 tuple. In DL traffic from a network to the remote UE, a higher layer of the relay UE provides a priority value to a D2D AS layer or a PDCP, and according to this value, the layer 2 of the relay UE allocates a packet to an existing logic channel or generates a new logic channel on a PC-5 protocol stack.

(2) The second embodiment of the present disclosure proposes a method for identifying a packet received by a server by using IP packet information such that each packet is directed to a proper remote UE without any information in the layer 1 and the layer 2.

A port number of an IP packet is an identification index of a remote UE and a priority of the packet. Most of all, the remote UE and a server need to share a port number policy that may be used to identify a packet. For example, a port number that is conventionally registered or that is not used by a previously fixed process may be clustered. Clusters have consecutive port numbers (except for the aforementioned excluded port number) that are equal to or greater than the number of D2D packet priorities. An order of a port number in each cluster means a priority. If there is a range of port numbers that are not allocated to anything, a set of the numbers may be a set of clusters. For example, dynamic or private ports may range from 49152 to 65535. A priority is assumed to be 8. Then, 2048 clusters may be generated. First clusters are 49152, 49153, ... , and 491259. 49153 indicates a priority 1 of a UE1, and 491259 indicates a priority 8 of UE1. This cluster information is dynamically shared between the relay UE and the server in advance or at the time of generation of relay traffic.

Figure 2:
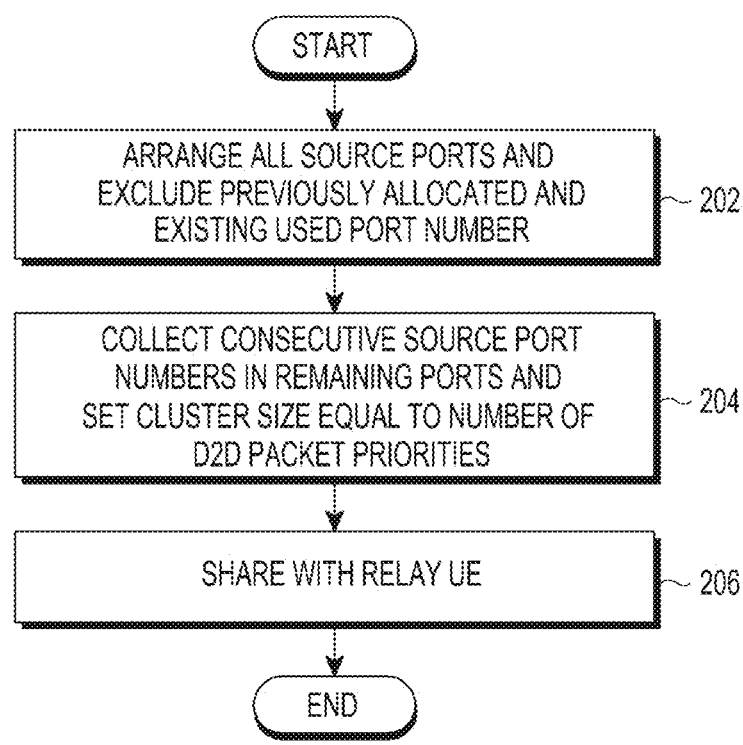
FIG. 2 is a flowchart illustrating operations of an eNB according to a second embodiment of the present disclosure.

FIG. 2 is a flowchart illustrating operations of an eNB according to a second embodiment of the present disclosure.

Referring to FIG. 2, in operation 202, an eNB arranges all source ports and excludes a previously allocated and existing used port number. In operation 204, the eNB generates a cluster including consecutive source port numbers among the remaining ports in which a cluster size is set equal to the number of D2D packet priorities.

In operation 206, the eNB shares, with the relay UE, the generated cluster, the set port number information, and the cluster size information.

Port number may include both a source port number and a destination port number because the remote UE and the server have the same port number mapping policy.

Figure 3:
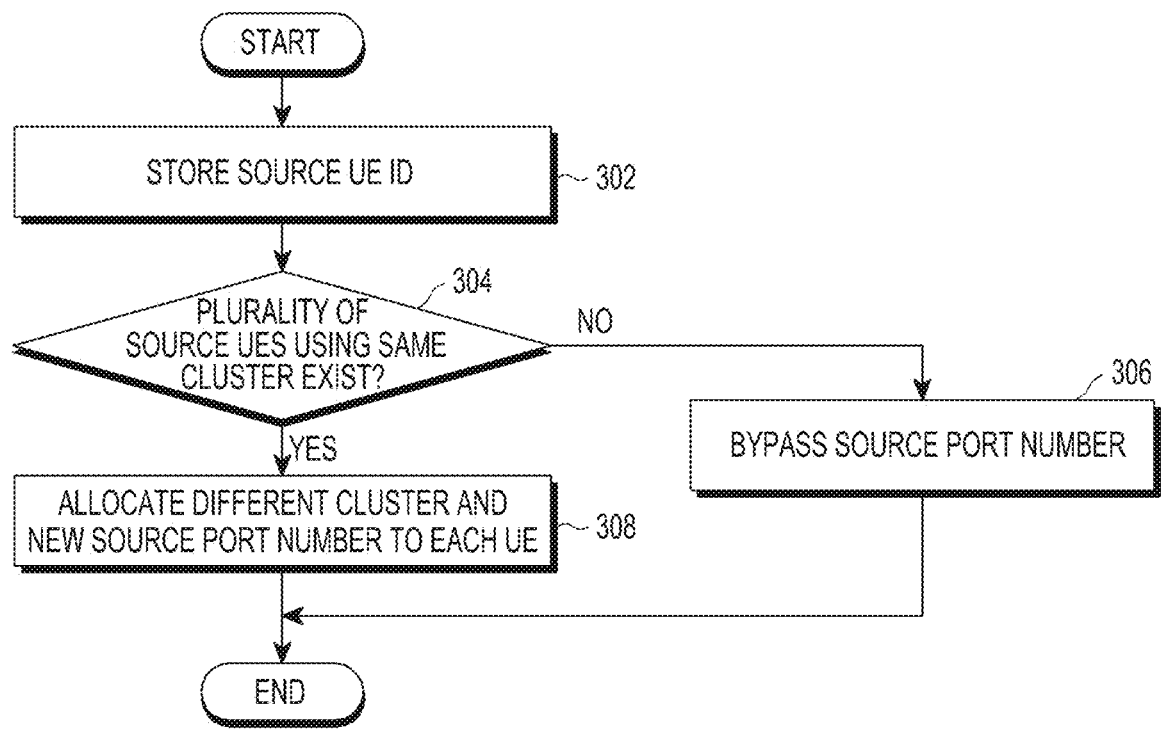
FIG. 3 is a flowchart illustrating operations of a relay UE according to an embodiment of the present disclosure.

If the relay UE and the server share the cluster information and the port number information with each other, the relay UE performs operations as shown in FIG. 3.

FIG. 3 is a flowchart illustrating operations of a relay UE according to an embodiment of the present disclosure.

In operation 302, the relay UE stores a source UE ID. In operation 304, the relay UE determines whether a plurality of source terminals using the same cluster exist.

If the plurality of source terminals using the same cluster do not exist, the relay UE bypasses a source port number of the received packet in operation 306. However, if the plurality of source terminals using the same cluster exist, the relay UE allocates a different cluster and a new source port number to each UE in operation 308.

The new source port number is determined by adding an LCID to a minimum source port number in the cluster and subtracting 1 from the addition result.

In this operation, the port number is a source port number. Cluster allocation may be a fixed policy or an arbitrary policy.

If the server receives an IP packet, the server processes the received IP packet using the above-described source port number. If there is a response having the processed packet, a packet is generated using a policy described below.

The policy is as described below. In response to received packet and port number from the remote UE, the server reflects a priority of the packet, thereby determining a destination port number in a cluster received from the remote UE.

Once receiving a packet from the server, the relay UE checks a port number to determine whether the port number is included in a cluster category. If the port number exists in the cluster category, the relay UE checks a storage table generated each time when a new port number is allocated to each relay packet received from the remote UE. There are a source UE, an allocated port number, and cluster information. By using a port number in a packet received from the server, the relay UE generates an LCID number again and transmits the packet to a related relay UE. The LCID is generated according to rules described below.

The LCID generation rules are as described below. A new LCID is determined by subtracting the minimum source port number in the cluster from a received destination port number and adding 1 to the subtraction result.

Figure 4:
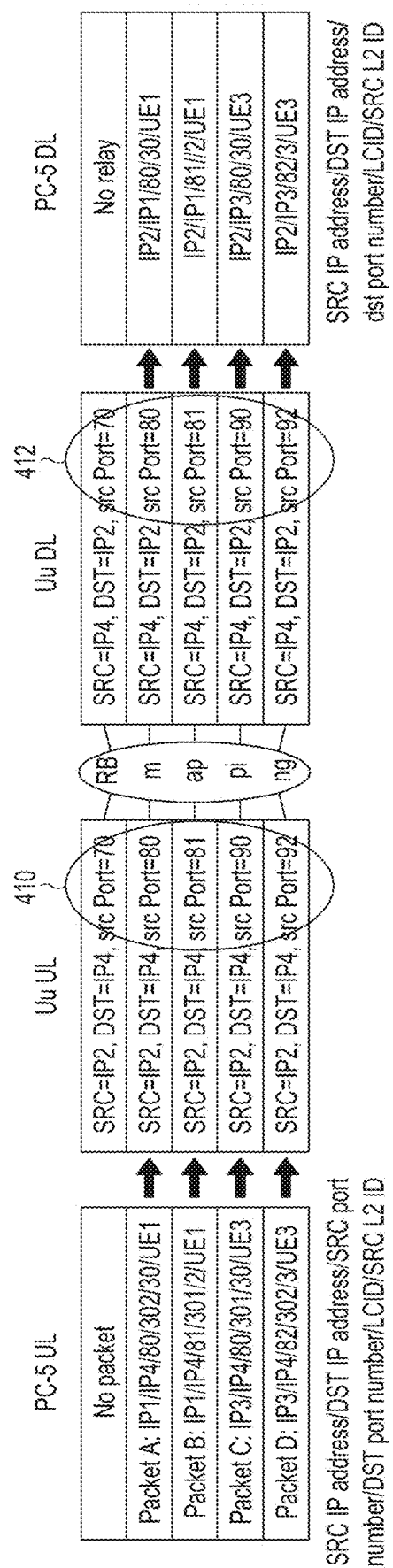
FIGS. 4 and 5 are QoS mapping diagrams of uplink (UL) traffic and downlink (DL) traffic according to an embodiment of the present disclosure.
Figure 5:
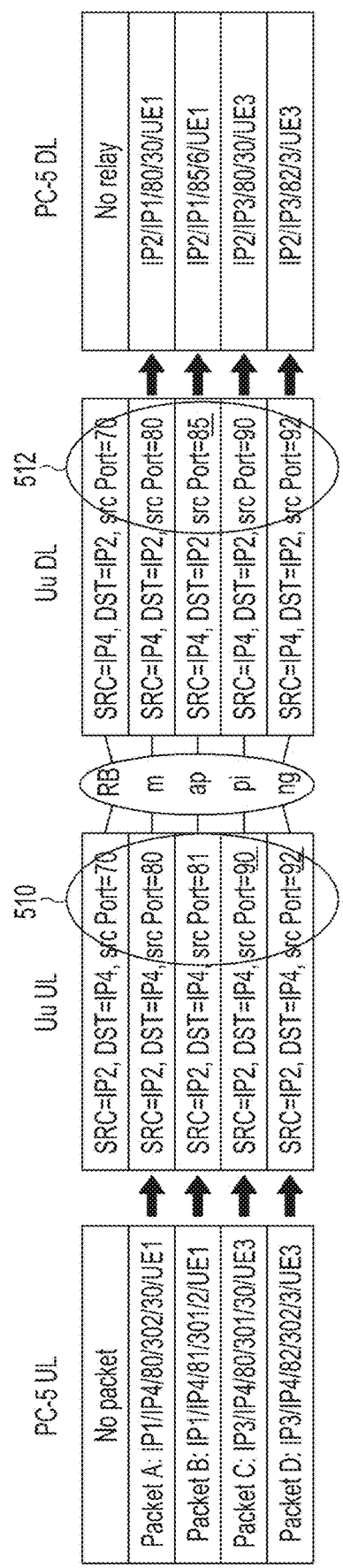

FIGS. 4 and 5 are QoS mapping diagrams of uplink (UL) traffic and downlink (DL) traffic according to an embodiment of the present disclosure.

As shown in FIG. 4, if a QoS 410 of UL traffic and a QoS 412 of DL traffic are the same as each other, an LCID and a port number of the DL traffic may have the same values as the UL traffic.

As shown in FIG. 5, if a QoS 510 of UL traffic and a QoS 512 of DL traffic are different from each other, an LCID and a port number of the DL traffic may not have the same values as the UL traffic. However, even if the QoS 510 of UL traffic and the QoS 512 of DL traffic are different from each other, the same LCID may be allocated using a port number mapping method. Then, new QoS traffic is generated and a new port number and an associated LCID are generated. The LCID reflects a priority because the port number generation policy reflects a priority and LCID fixed mapping policy.

(3) The third embodiment of the present disclosure proposes a method for mapping a received packet to an EPS bearer.

The present disclosure proposes a method for a network relay UE (relay UE) to differentiate traffic from general traffic as well as indication of a priority for the relay UE.

There are three methods as described below.

In Method 1, a dedicated EPS bearer is dedicated to relay traffic.

In Method 2, there is no dedicated EPS bearer or radio bearer for relay traffic. Relay traffic of a TX buffer is prioritized over other traffic.

In Method 3, an EPS bearer is identical both for relay traffic and general traffic, but a radio bearer is dedicated to relay traffic. After Method 1 through Method 3 are described, other bearer mapping rules will be described with reference to FIGS. 26 through 28.

Sub-Embodiment 1 of the Third Embodiment of the Present Disclosure: Dedicated EPS Bearer Allocation In the sub-embodiment 1 of the third embodiment of the present disclosure, a dedicated EPS bearer is allocated to relay traffic. Each EPS bearer has its own QoS profile, and parameters such as a QoS class of identifier (QCI), traffic flow templates (TFT), etc. Thus, if the dedicated EPS bearer is created, the relay UE, the eNB, and other network entities follow an EPS-bearer related policy including a radio layer and an EPC layer. There are two schemes depending on when the dedicated EPS bearer is created for the relay traffic.

In a first scheme, the dedicated EPS bearer is configured when a default EPS bearer is configured.

In a second scheme, the dedicated EPS bearer is dynamically configured when the dedicated EPS bearer is needed.

1. Static Scheme

In the static scheme, the dedicated EPS bearer for relay traffic is created when the relay UE is connected to a network. Several dedicated EPS bearers may be created one by one for each PDN supported by the relay UE. In an embodiment, depending on a place where relay UE information for autonomously generating the dedicated EPS bearer for relay traffic in a connection procedure is stored, an MME based scheme (shown in FIG. 8) and an HSS based scheme (shown in FIG. 6) may be provided. After the default EPS bearer is created, a dedicated EPS bearer request may be generated without indication of relay traffic from the relay UE.

Figure 6:
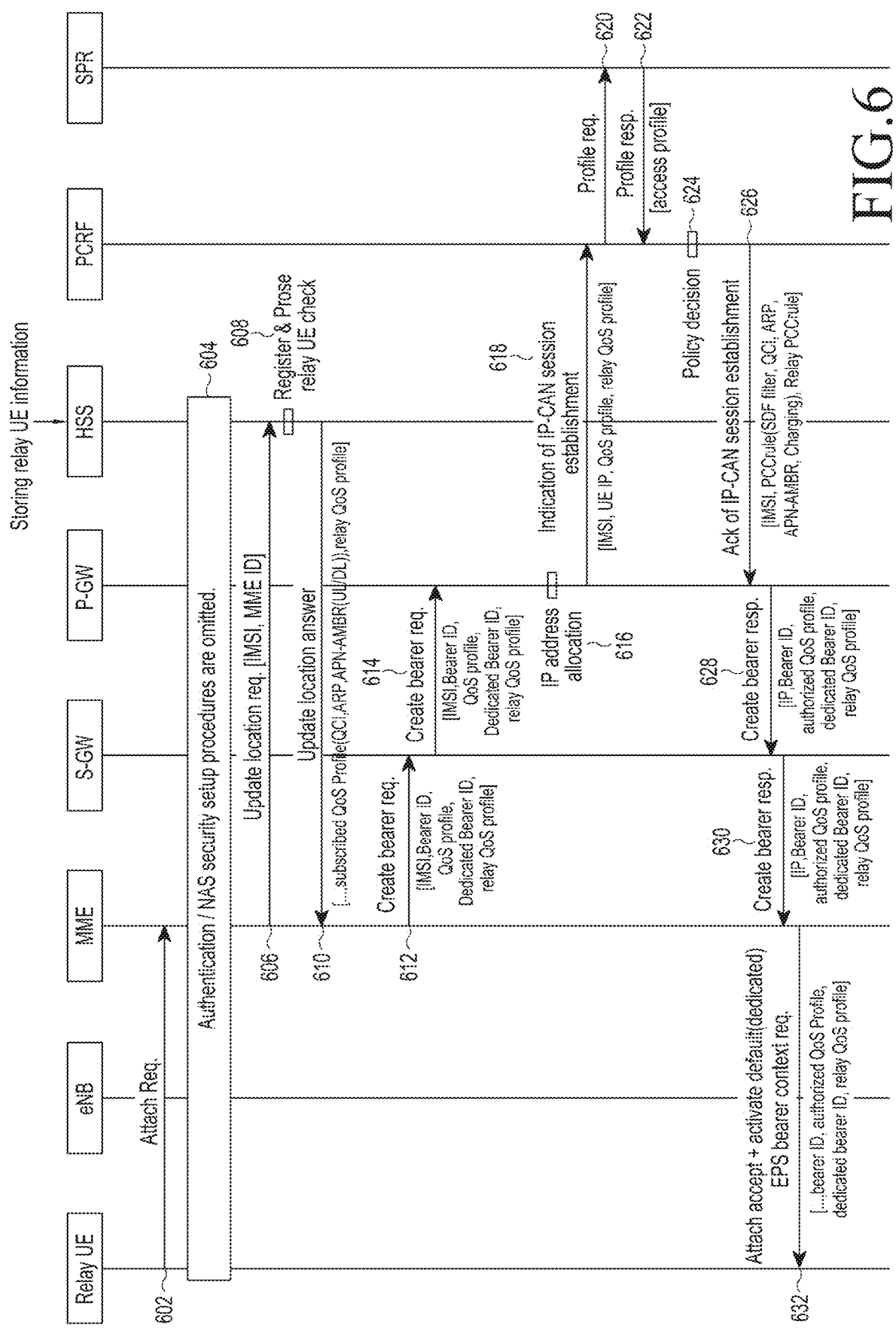
FIG. 6 is a flowchart illustrating a connection procedure in a home subscriber server (HSS) according to an embodiment of the present disclosure.

FIG. 6 is a flowchart illustrating a connection procedure in a home subscriber server (HSS) according to an embodiment of the present disclosure.

It is assumed that information related to a relay UE has already been stored in an HSS. Operations 612 through 630 described below will be referred to as a bearer creation process.

The relay UE transmits an attach request message to an MME through an eNB in operation 602.

In operation 604, the MME then performs authentication between the relay UE and the HSS/an NAS security procedure between the relay UE and the MME in which NAS is a protocol between the relay UE and the MME. A detailed description thereof will not be provided.

In operation 606, the MME transmits an update location request message including an IMSI and an MME ID to the HSS. The HSS then registers the relay UE and determines whether the UE is a relay UE in operation 608. At first, the HSS has relay UE IMSI information that may be obtained from a sort of ProSe server. If determining that UE is a stored relay UE, the HSS provides information about a subscribed QoS profile (QCI, allocation and retention priority (ARP), APN-AMBR (UL/DL)), information about a relay QoS profile, and so forth to the MME in operation 610.

The MME having received the information transmits a create bearer request message including an IMSI, a bearer ID, a QoS profile, a requested dedicated bearer ID, and requested QoS profile information to a P-GW through an S-GW in operations 612 and 614. The P-GW allocates an IP address based on the received information in operation 616.

The P-GW transmits a message requesting indication of IP-CAN session establishment including an IMSI, a QoS profile, and a relay QoS profile to the PCRF in operation 618. The PCRF sends a profile request to the SPR and receives the profile from the SPR in operations 620 and 622.

The PCRF compares the requested QoS information with the QoS received from the SPR to decide a policy in operation 624. QoS parameters (relay policy and charging control (PCC) rules) reflecting the comparison result and finally negotiated are transmitted from the PCRF to the P-GW in operation 626.

The P-GW transmits a create bearer response message including a dedicated bearer ID newly generated by the P-GW and negotiated relay QoS values to the MME in operations 628 and 630. Upon receiving the create bearer response message, the MME transmits an attach accept message including the newly created dedicated EPS bearer and the QoS profile to the relay UE in operation 632. In operation 632, the eNB receives the create bearer response message from the MME to create a data radio bearer (DRB) related to the newly created dedicated EPS bearer and maps the DRB to the EPS bearer. Radio layer information such as a DRB ID, a related EPS bearer ID, configurations on a layer L2, and QoS profiles is included in a radio resource control (RRC) message also including an NAS message. The RRC message is transmitted to the relay UE. Then, finally, the relay UE may know the DRB ID, the related EPS bearer ID, and the QoS profiles. After this procedure, each time when relay traffic is received from the remote UE, the relay UE puts the packet in the related DRB and EPS bearer, and follows QoS processing related to the dedicated EPS bearer.

Figure 7:
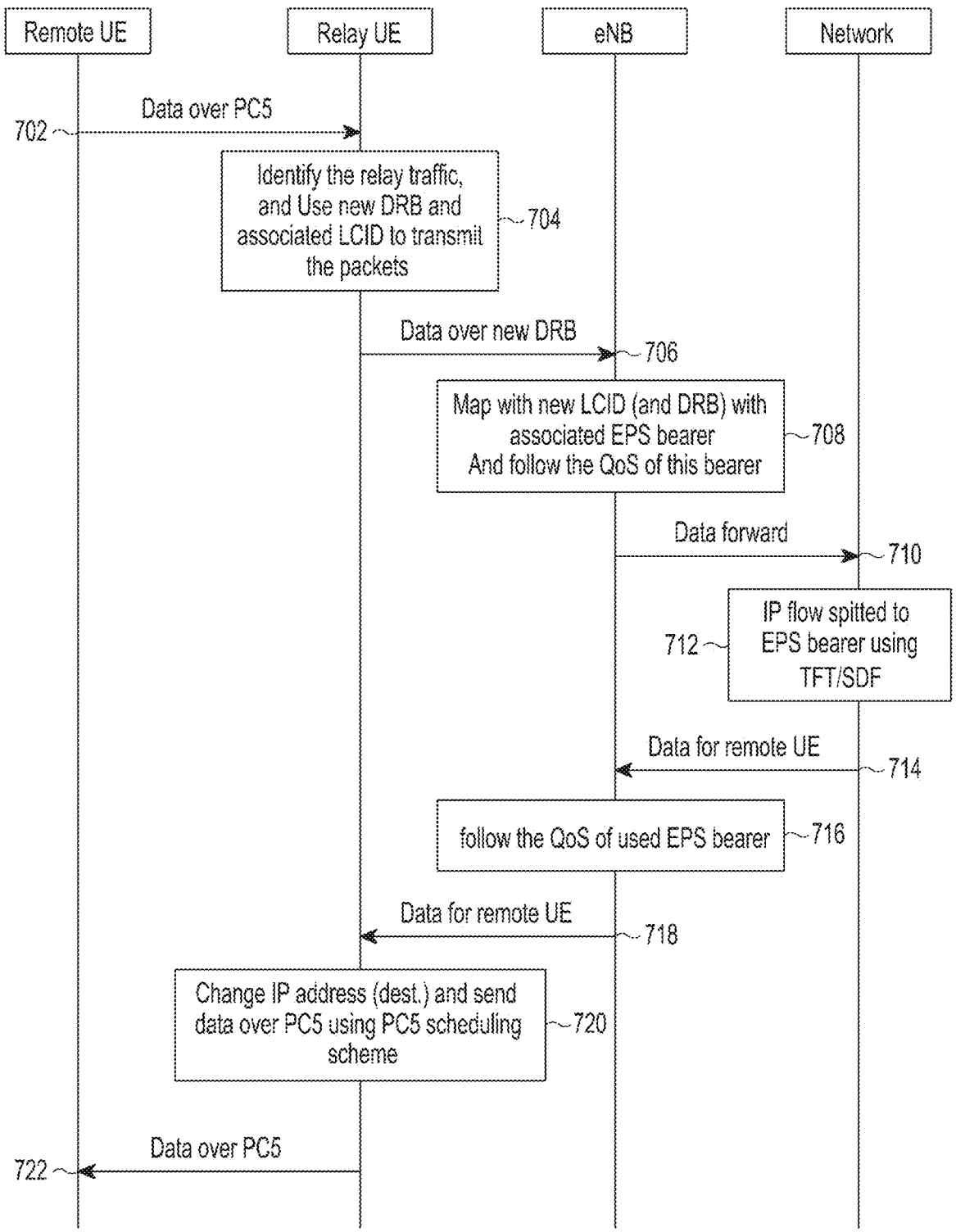
FIG. 7 is a flowchart illustrating operations after bearer configuration according to an embodiment of the present disclosure.

FIG. 7 is a flowchart illustrating operations after bearer configuration according to an embodiment of the present disclosure.

FIG. 7 shows how the eNB and the relay UE operate after new EPS bearer configuration.

In operation 702, the remote UE receives data from the remote UE. In operation 704, the relay UE then identifies relay traffic and generates a packet including associated QoS parameters by using the newly generated DRB and the related LCID.

In operation 706, the relay UE transmits the generated packet to the eNB. The eNB maps the packet with the associated EPS bearer known to the relay UE in the connection procedure of FIG. 6 in operation 708, and transmits data reflecting the mapping result to the network in operation 710. Herein, the network may be at least one of MME, S-GW, P-GW, and PCRF of FIG. 6.

In operation 712, the network classifies an IP flow as an EPS bearer in DL traffic to the remote UE according to a TFT or a service data flow (SDF), and the EPS bearer should be a newly created dedicated EPS bearer in an embodiment of the present disclosure. The network transmits data to the eNB through the newly created dedicated EPS bearer in operation 714. The eNB then maps a transmission packet to a DRB related to the newly created EPS bearer in operation 716. The eNB transmits data to the relay UE by using a QoS parameter in operation 718. The relay UE changes an IP destination address in an IP layer in operation 720, and transmits the data to the remote UE through PC-5 in operation 722.

PC-1 through PC-5 indicate interfaces in a ProSe network. PC-1 is an interface between a ProSe application of a remote terminal and a server, and is used for application-level signaling. PC-2 is an interface between a server and a ProSe function in an EPC. PC-3 is an interface between a terminal and the ProSe function in the EPC, and PC-4b is an interface between a secure user plane location (SUPL) location platform (SLP) and the ProSe function in the EPC. PC-5 is an interface between terminals.

Figure 8:
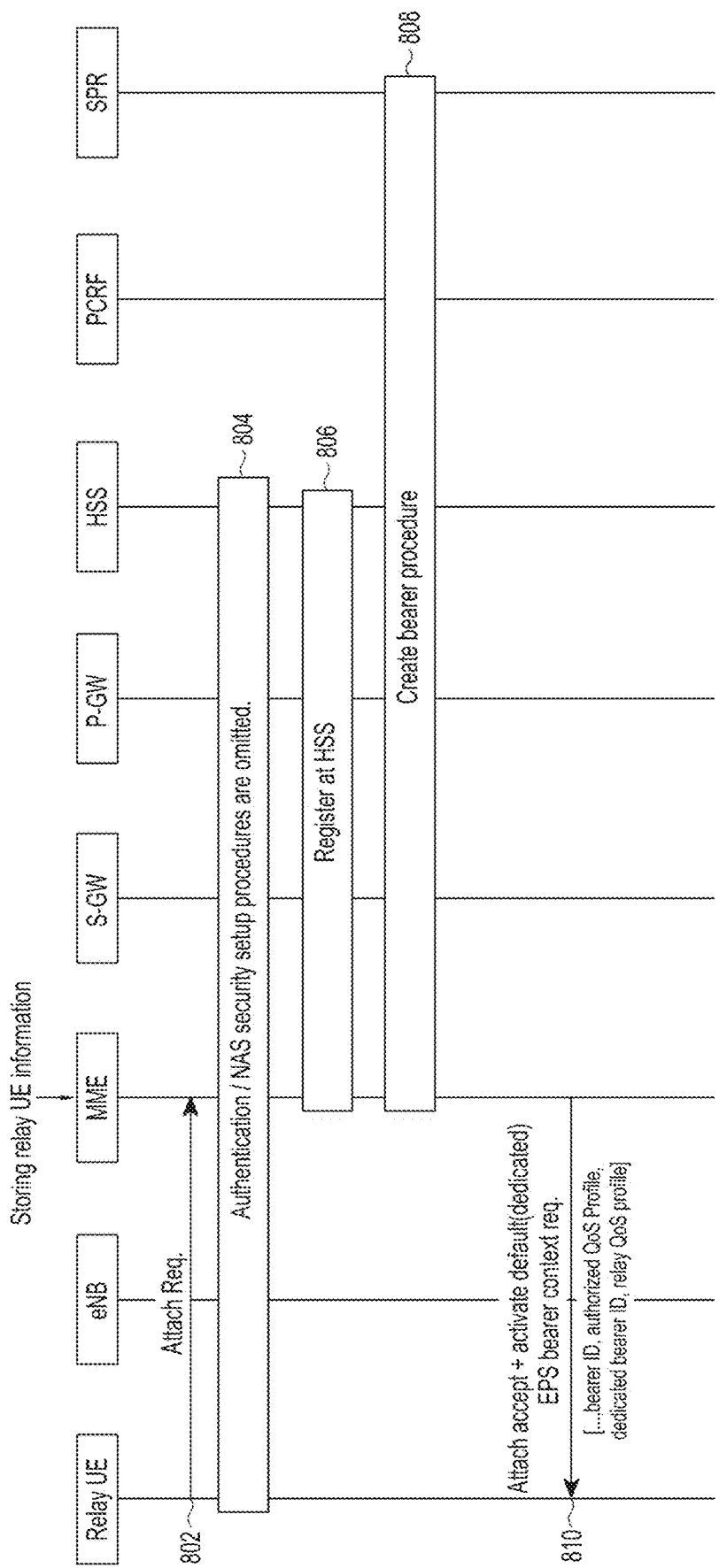
FIG. 8 is a flowchart illustrating a connection procedure in a mobility management entity (MME) according to an embodiment of the present disclosure.

FIG. 8 is a flowchart illustrating a connection procedure in an MME according to an embodiment of the present disclosure.

The procedure of FIG. 8 is almost similar with the connection procedure of FIG. 6 except that the HSS does not store information related to the relay UE in advance.

If the MME receives a connection request message instead of having the information related to the relay UE, the MME, after being registered at the HSS in operation 806, determines whether the UE is a relay UE; if the UE is the relay UE, the MME initiates a create bearer procedure by using QoS requirements that are preset for the relay traffic in operation 808.

The preset QoS requirements are stored in the MME in advance. The create bearer message is transmitted to the PCRF through the S-GW and the P-GW. The PCRF compares the required QoS values with the SPR such that a finally negotiated QoS value returns to the P-GW. The P-GW creates the dedicated EPS bearer and transmits a create bearer response to the MME, together with an ID of the EPS bearer and the negotiated QoS values. The MME provides the information to the UE through the eNB. In this process, the eNB creates a new DRB related to the newly created dedicated EPS bearer. The eNB receives the create bearer response message from the MME to create a DRB related to the newly created dedicated EPS bearer and maps the DRB to the EPS bearer. Radio layer information such as a DRB ID, an associated EPS bearer ID, configurations on a layer L2, and QoS profiles is included in an RRC message also including an NAS message. The RRC message is transmitted to the relay UE. Then, finally, the relay UE may know the DRB ID, the associated EPS bearer ID, and the QoS profiles. After this procedure, each time when relay traffic is received from the remote UE, the relay UE puts the packet in the associated DRB and EPS bearer, and follows QoS processing related to the dedicated EPS bearer.

Figure 9:
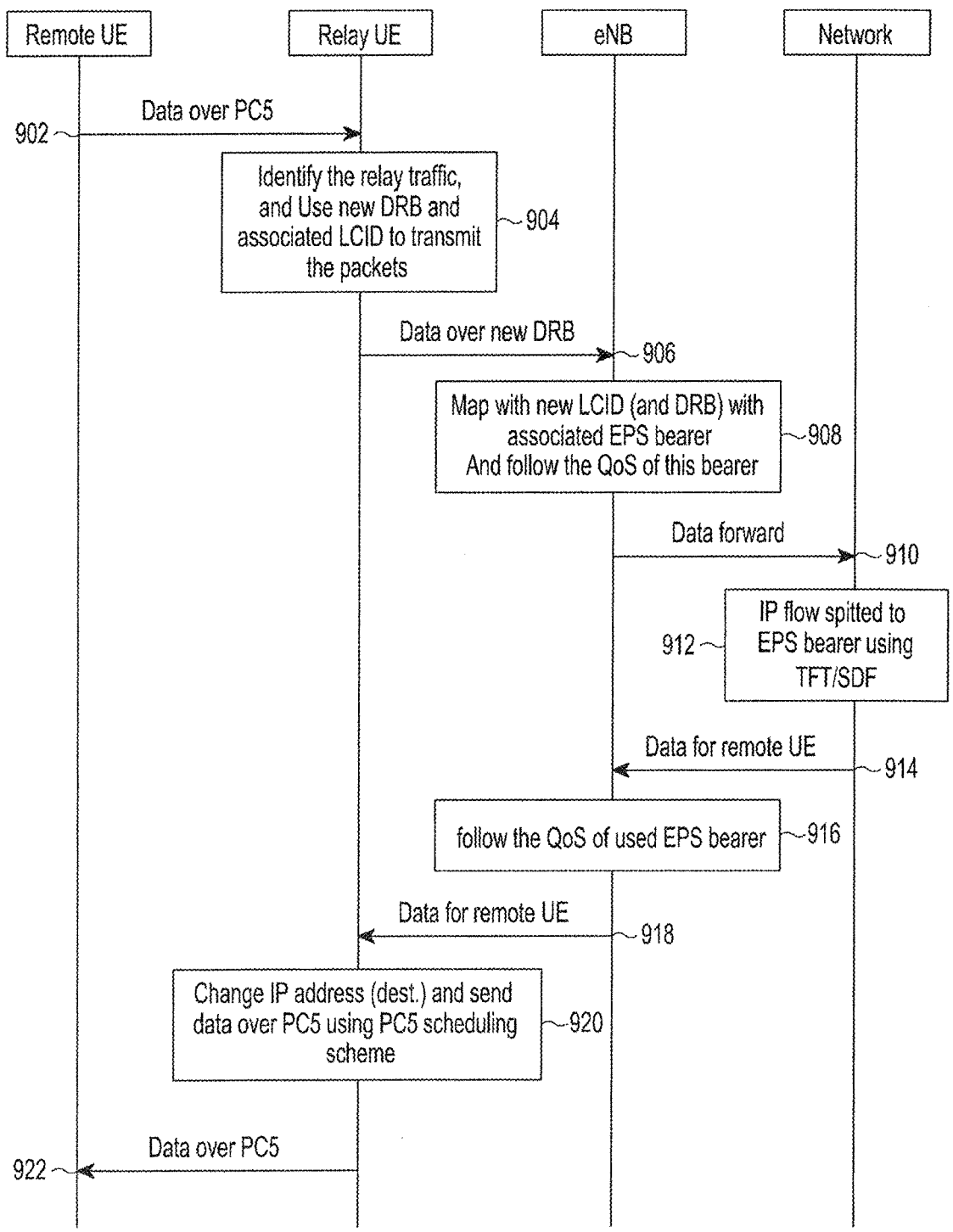
FIG. 9 is a flowchart illustrating operations after bearer configuration according to an embodiment of the present disclosure.

FIG. 9 is a flowchart illustrating operations after bearer configuration according to an embodiment of the present disclosure.

The procedure of FIG. 9 is similar with the operations of FIG. 7. When compared to in FIG. 7, in FIG. 9, the MME stores information related to a relay UE in advance instead of storing the information related to the relay UE in advance in the HSS.

FIG. 9 shows how the eNB and the relay UE operate after new EPS bearer configuration.

In operation 902, the remote UE receives data from the remote UE. In operation 904 the relay UE then identifies relay traffic and generates a packet including associated QoS parameters by using the newly generated DRB and the associated LCD.

In operation 906, the relay UE transmits the generated packet to the eNB. The eNB maps the packet with the associated EPS bearer known to the relay UE in the connection procedure of FIG. 8 in operation 908, and transmits data reflecting the mapping result to the network in operation 910. Herein, the network may be at least one of MME, S-GW, P-GW, and PCRF of FIG. 8.

In operation 912, the network classifies an IP flow as an EPS bearer in DL traffic to the remote UE according to a TFT or an SDF, and the EPS bearer should be a newly created dedicated EPS bearer in an embodiment of the present disclosure. The network transmits data to the eNB through the newly created dedicated EPS bearer in operation 914. The eNB then maps a transmission packet to a DRB related to the newly created EPS bearer in operation 916. The eNB transmits data to the relay UE by using a QoS parameter in operation 918. The relay UE changes an IP destination address in an IP layer in operation 920, and transmits the data to the remote UE through PC-5 in operation 922.

Figure 10:
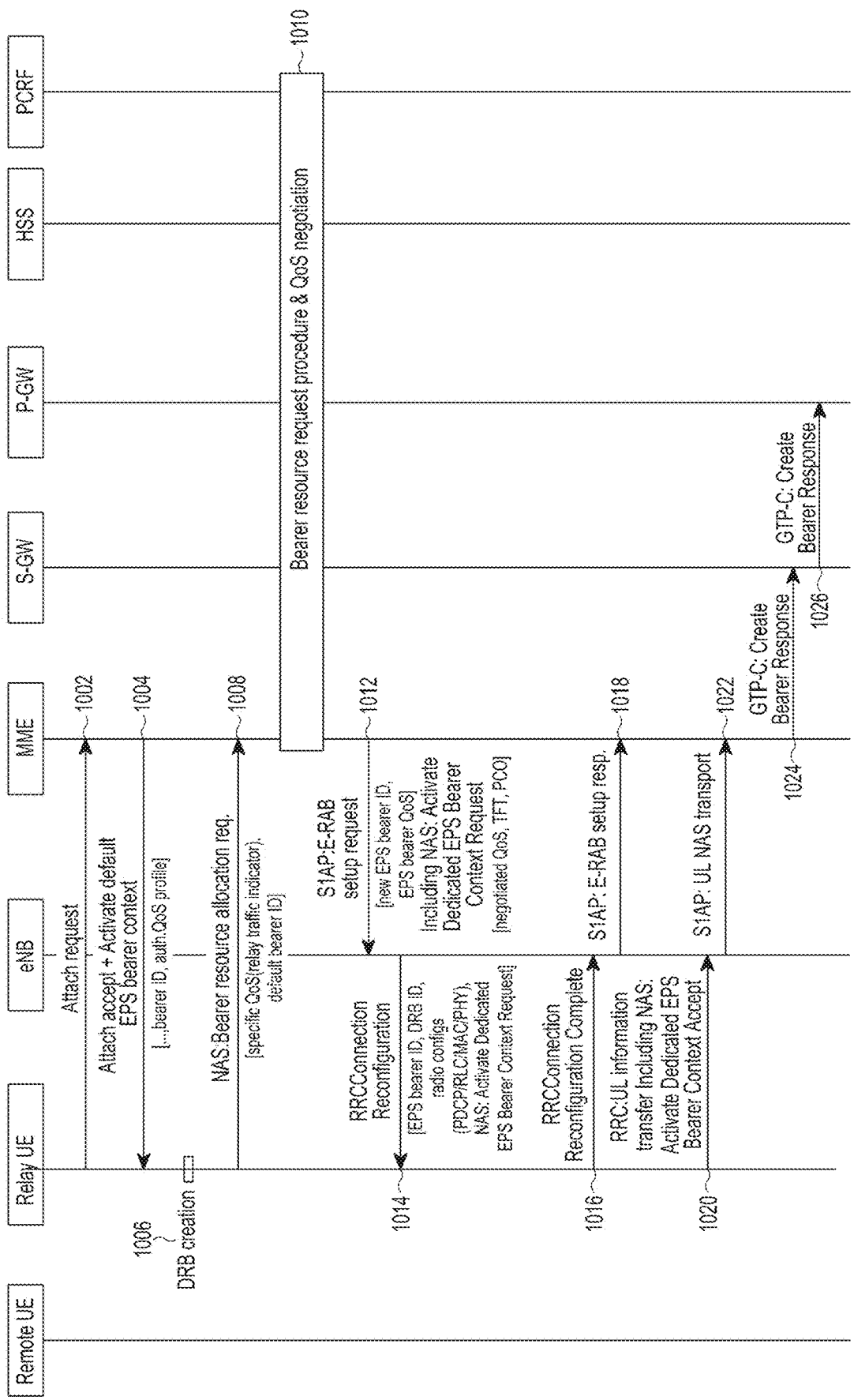
FIG. 10 is a flowchart illustrating operations in a static scheme after a connection procedure according to an embodiment of the present disclosure.

FIG. 10 is a flowchart illustrating operations in a static scheme after a connection procedure according to an embodiment of the present disclosure.

In FIG. 10, it is assumed that an attach process (including operations 1002, 1004, and 1006) is performed in advance, and a default EPS bearer is previously set.

The relay UE transmits an NAS message requesting bearer resource allocation to the MME in operation 1008. The NAS message includes a relay traffic indicator, a default bearer ID, and so forth. The relay traffic indicator indicates whether traffic corresponds to relay traffic.

The MME obtains a new dedicated EPS bearer together with associated QoS parameters by passing through the S-GW, the P-GW, and the PCRF in operation 1010. The MME then delivers a new EPS bearer ID and QoS parameters to the relay UE through the eNB by using the NAS message in operation 1012. As in operation 1014, the RRC message, when transmitted to the relay UE of the eNB, may include a new DRB ID and radio configuration information related to a corresponding DRB. The relay UE responds to the RRC message and the NAS message in operations 1016, 1018, 1020, and 1022. Thereafter, the MME transmits a radio bearer response message to the P-GW through the S-GW in operations 1024 and 1026.

Figure 11:
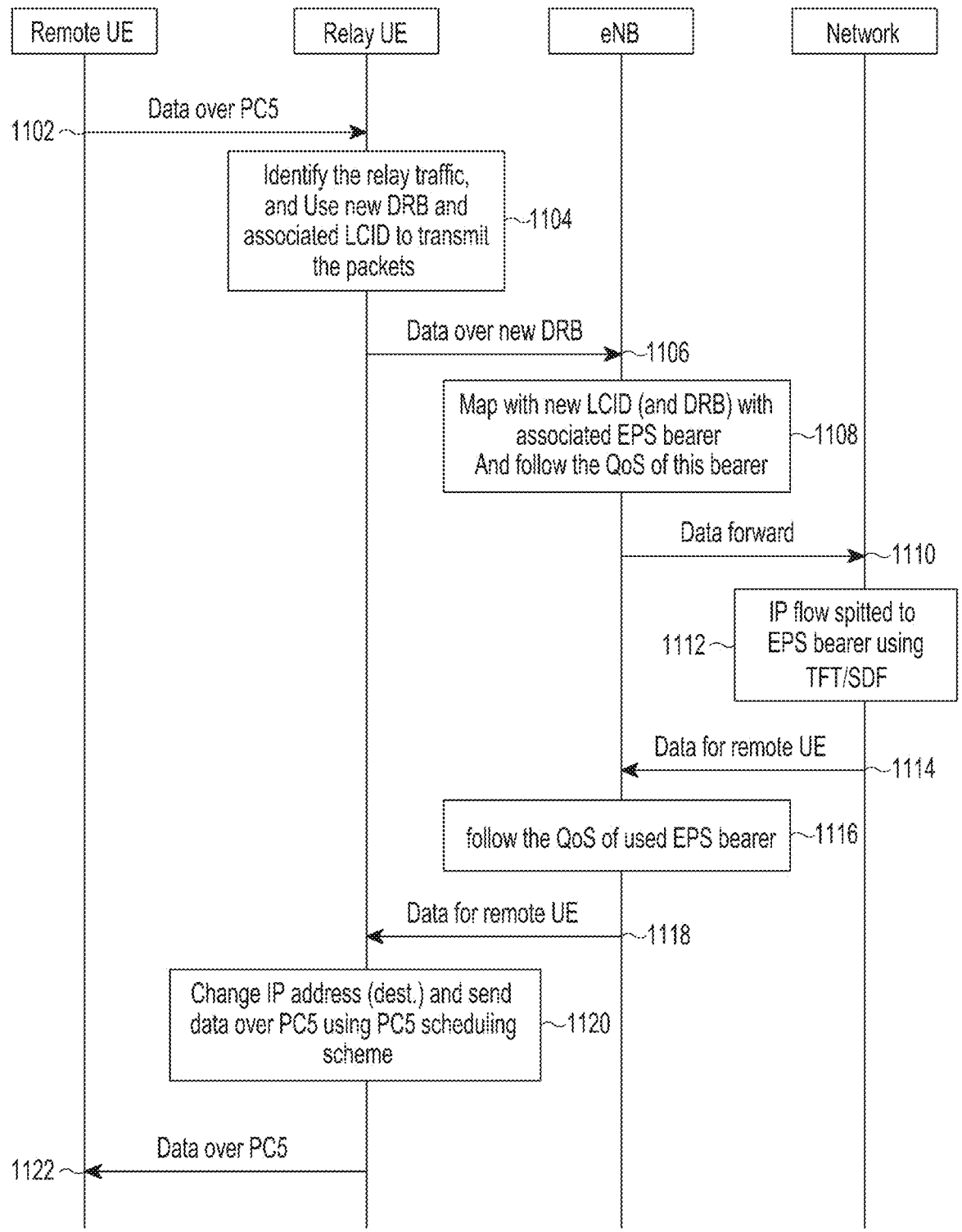
FIG. 11 is a flowchart illustrating static operations after bearer connection setup according to an embodiment of the present disclosure.

FIG. 11 is a flowchart illustrating static operations after bearer connection setup according to an embodiment of the present disclosure.

FIG. 11 shows how the eNB and the relay UE operate after new EPS bearer configuration.

In operation 1102, the remote UE receives data from the remote UE. In operation 1104 the relay UE then identifies relay traffic and generates a packet including associated QoS parameters by using the newly generated DRB and the associated LCID.

In operation 1106, the relay UE transmits the generated packet to the eNB. The eNB maps the packet with the associated EPS bearer known to the relay UE in the connection procedure of FIG. 10 in operation 1108, and transmits data reflecting the mapping result to the network in operation 1110. Herein, the network may be at least one of MME, S-GW, P-GW, and PCRF of FIG. 10.

In operation 1112, the network classifies an IP flow as an EPS bearer in DL traffic to the remote UE according to a TFT or an SDF, and the EPS bearer should be a newly created dedicated EPS bearer in an embodiment of the present disclosure. The network transmits data to the eNB through the newly created dedicated EPS bearer in operation 1114. The eNB then maps a transmission packet to a DRB related to the newly created EPS bearer in operation 1116. The eNB transmits data to the relay UE by using a QoS parameter in operation 1118. The relay UE changes an IP destination address in an IP layer in operation 1120, and transmits the data to the remote UE through PC-5 in operation 1122.

Figure 12:
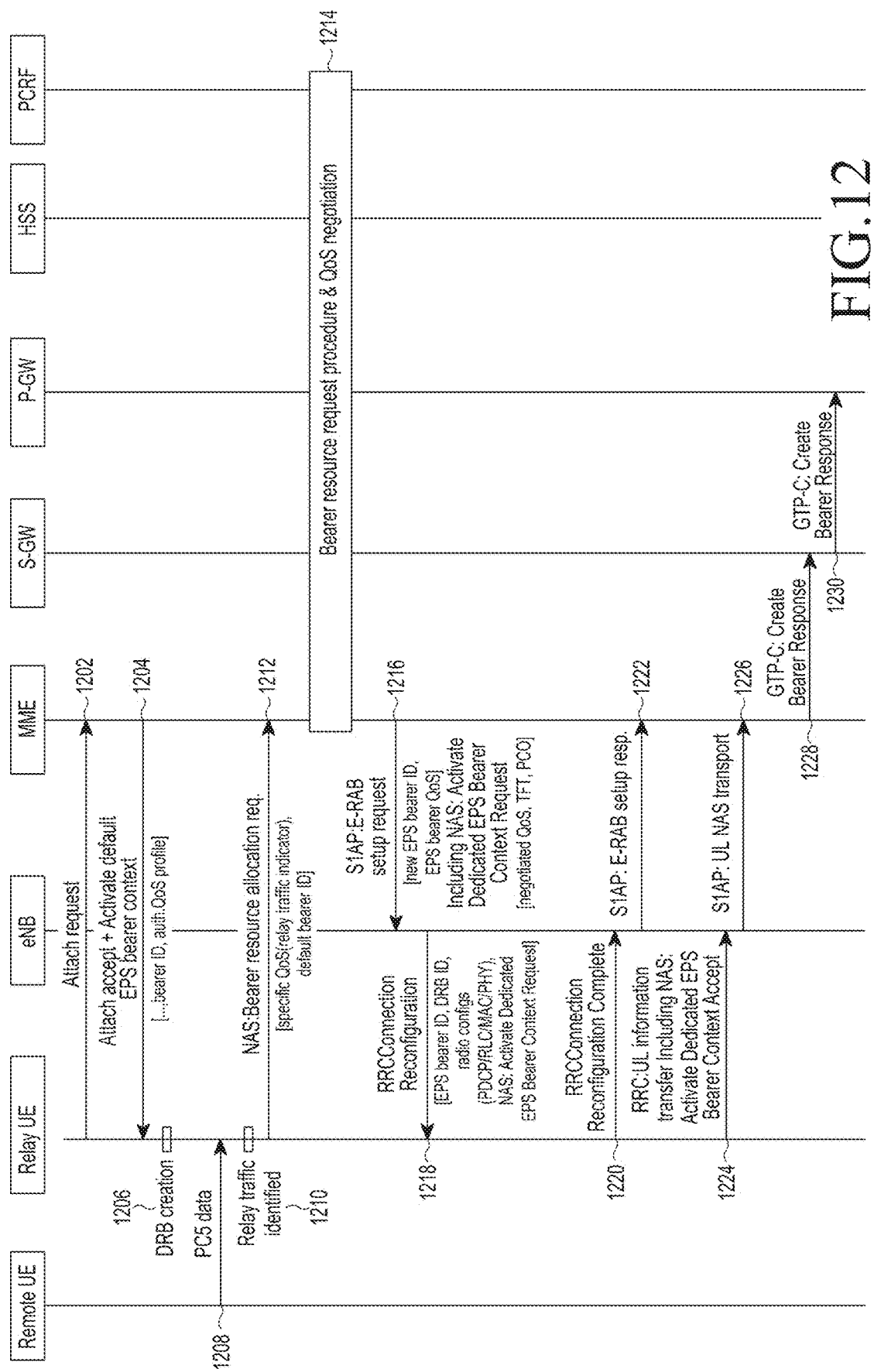
FIG. 12 is a flowchart illustrating operations in a dynamic scheme after a connection procedure according to an embodiment of the present disclosure.

FIG. 12 is a flowchart illustrating operations in a dynamic scheme after a connection procedure according to an embodiment of the present disclosure.

In the dynamic scheme, the relay UE receives a relay traffic indicator from the remote UE in operation 1206 and determines whether the traffic is a relay traffic in operation 1208. Herein, the relay traffic indicator indicates whether the traffic corresponds to relay traffic. If the relay UE identifies the traffic as the relay traffic the relay UE actively requests dedicated EPS bearer configuration in operation 1212. The procedure of FIG. 12 is similar with that of FIG. 10 except that the relay UE has to first receive relay traffic. After the connection procedure, the DRB is created by the relay UE that is an associated default EPS bearer, in operation 1206.

The relay UE identifies the relay traffic after receiving data from the PC-5 interface. Based on this, the relay UE transmits an NAS message requesting bearer resource allocation to the MME in operation 1212. The NAS message includes a relay traffic indicator, a reference default bearer ID, etc. Herein, the relay traffic indicator indicates whether the traffic corresponds to relay traffic. The MME obtains a new dedicated EPS bearer together with associated QoS parameters by passing through the S-GW, the P-GW, and the PCRF in operation 1214. The MME then delivers a new EPS bearer ID and QoS parameters to the relay UE through the eNB by using the NAS message in operation 1216. As in operation 1218, the RRC message, when transmitted to the relay UE of the eNB, may include a new DRB ID and radio configuration information related to a corresponding DRB. The relay UE responds to the RRC message and the NAS message in operations 1220, 1222, 1224, and 1226. Thereafter, the MME transmits a radio bearer response message to the P-GW through the S-GW in operations 1228 and 1230.

Figure 13:
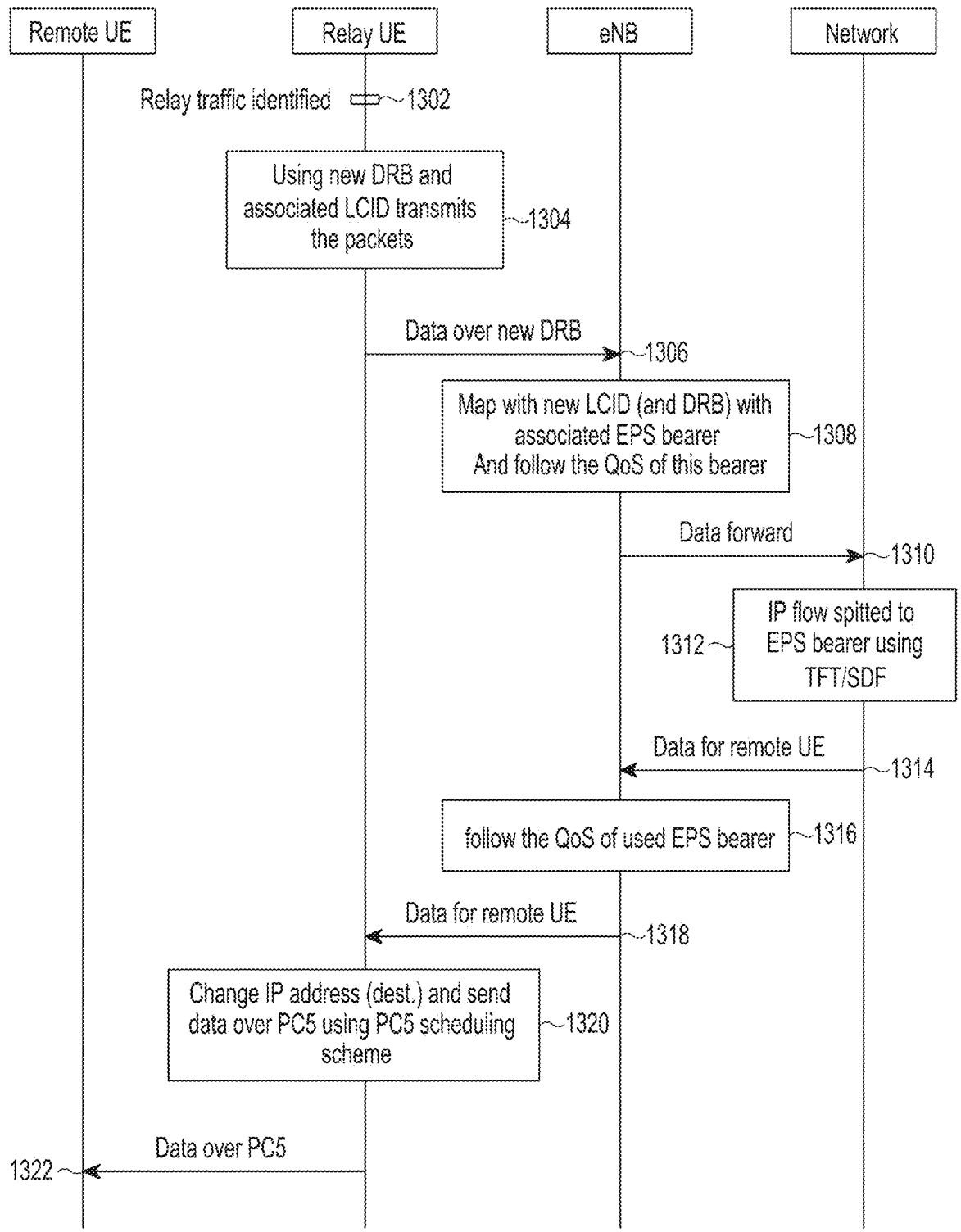
FIG. 13 is a flowchart illustrating operations after connection setup according to an embodiment of the present disclosure.

FIG. 13 is a flowchart illustrating dynamic operations after connection setup according to an embodiment of the present disclosure.

FIG. 13 shows how the eNB and the relay UE operate after new EPS bearer configuration. It is assumed that there already exists identified relay traffic in the relay UE.

The relay UE then identifies relay traffic in operation 1302, and generates a packet including associated QoS parameters by using the newly generated DRB and the associated LCID in operation 1304.

In operation 1306, the relay UE transmits the generated packet to the eNB. The eNB maps the packet with the associated EPS bearer known to the relay UE in the connection procedure of FIG. 12 in operation 1308, and transmits data reflecting the mapping result to the network in operation 1310. Herein, the network may be at least one of MME, S-GW, P-GW, and PCRF of FIG. 12.

In operation 1312, the network classifies an IP flow as an EPS bearer in DL traffic to the remote UE according to a TFT or an SDF, and the EPS bearer should be a newly created dedicated EPS bearer in an embodiment of the present disclosure. The network transmits data to the eNB through the newly created dedicated EPS bearer in operation 1314. The eNB then maps a transmission packet to a DRB related to the newly created EPS bearer in operation 1316. The eNB transmits data to the relay UE by using a QoS parameter in operation 1318. The relay UE changes an IP destination address in an IP layer in operation 1320, and transmits the data to the remote UE through PC-5 in operation 1322.

Sub-Embodiment 2 of the Third Embodiment of the Present Disclosure: Higher Layer Indication of TX Order and Prioritization FIG. 14 is a structural diagram of layers of a relay UE according to a sub-embodiment 2 of the third embodiment of the present disclosure.

Figure 14:
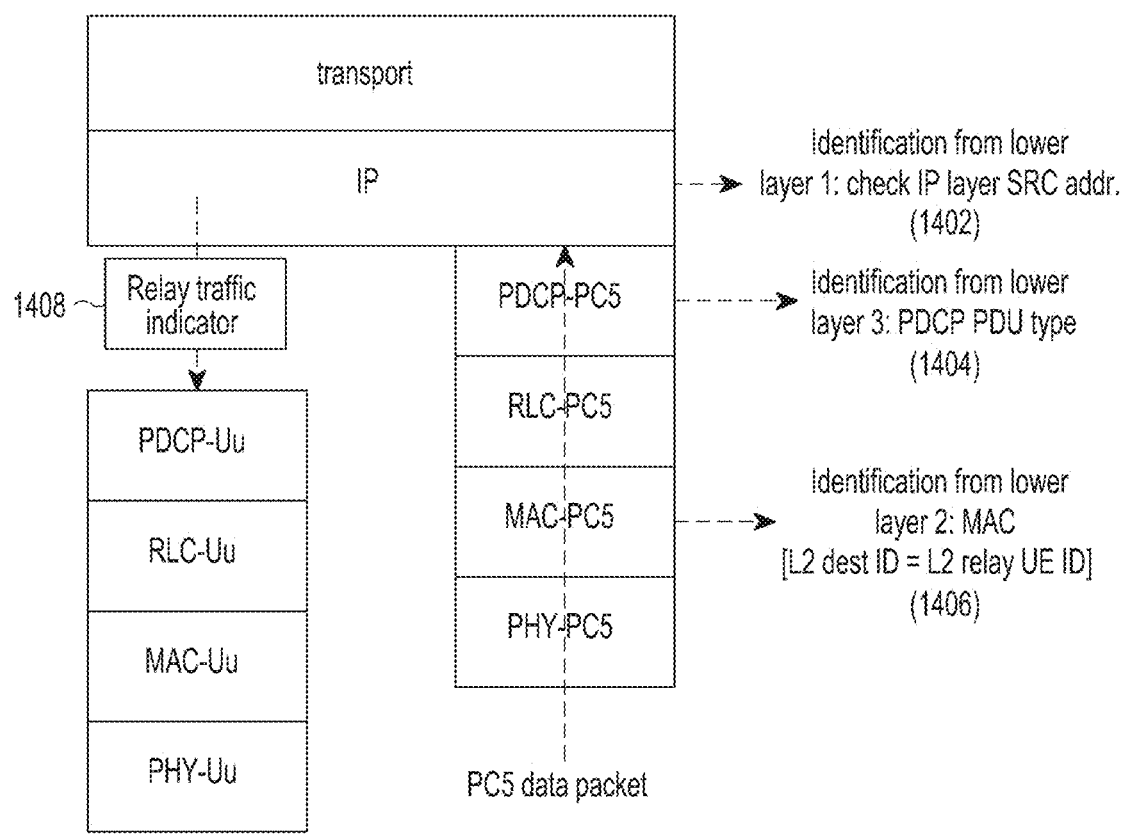
FIG. 14 is a structural diagram of layers of a relay UE according to a sub-embodiment 2 of a third embodiment of the present disclosure.

As shown in FIG. 14, the relay UE has two L2 protocol stacks, one of which is intended for PC-5 and the other of which is intended for a Uu interface.

L2 sub layers and an IP layer need to distinguish relay traffic generated by the remote UE from traffic generated by the relay UE. This may be determined by a MAC layer, a PDCP layer, or an IP layer. In the MAC layer, an L2 destination ID 1406 in a PC-5 PDU may be used for the distinguishment. An L2 destination ID 1404 configured for a relay UE ID in the PC-5 PDU indicates that the received packet is intended for relaying. A PDU type in a PC-5 PDU of a PDCP layer may indicate the same. A destination IP address 1402 of the IP layer may also be used to indicate the same. If a destination IP address in a received IP packet is not an IP address for relaying, the received IP packet is intended for relaying. When packets are transmitted according to a packet data convergence protocol (PDCP) in which the packets are transmitted through the Uu interface, the IP layer indicates to the PDCP, whether the IP packet corresponds to the relay traffic through a relay traffic indicator 1408.

Figure 15:
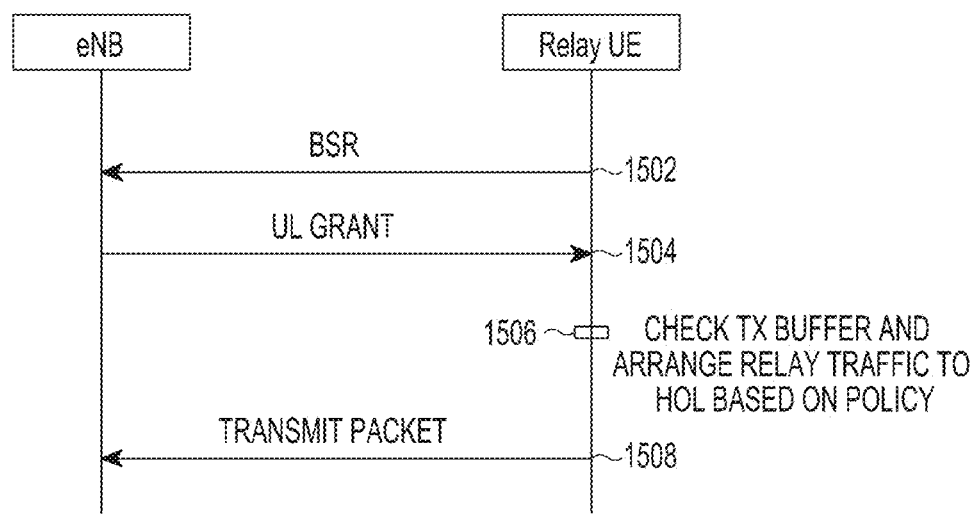
FIG. 15 is a flowchart illustrating operations of a relay UE after a relay traffic indicator is obtained according to an embodiment of the present disclosure.

FIG. 15 is a flowchart illustrating operations of a relay UE after a relay traffic indicator is obtained according to an embodiment of the present disclosure.

The relay UE transmits a buffer status report (BSR) request message for a UL grant to the eNB in operation 1502.

The relay UE receives a UL grant message from the eNB in operation 1504.

In operation 1506, the relay UE checks a transmission (TX) buffer and arranges relay traffic based on a prioritization policy according to an embodiment of the present disclosure.

In operation 1508, the relay UE transmits a packet to the eNB.

Figure 16A:
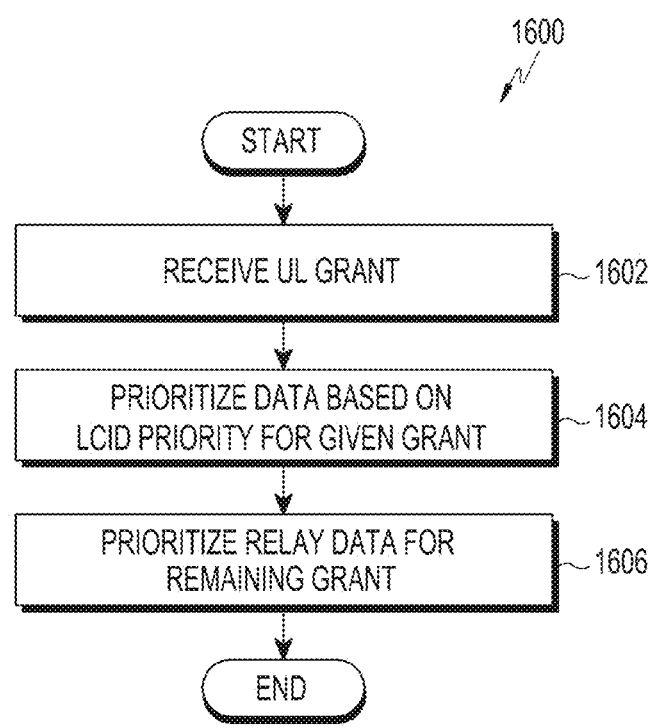
FIGS. 16A through 16C illustrate a prioritization policy in a relay UE according to another embodiment of the present disclosure.
Figure 16B:
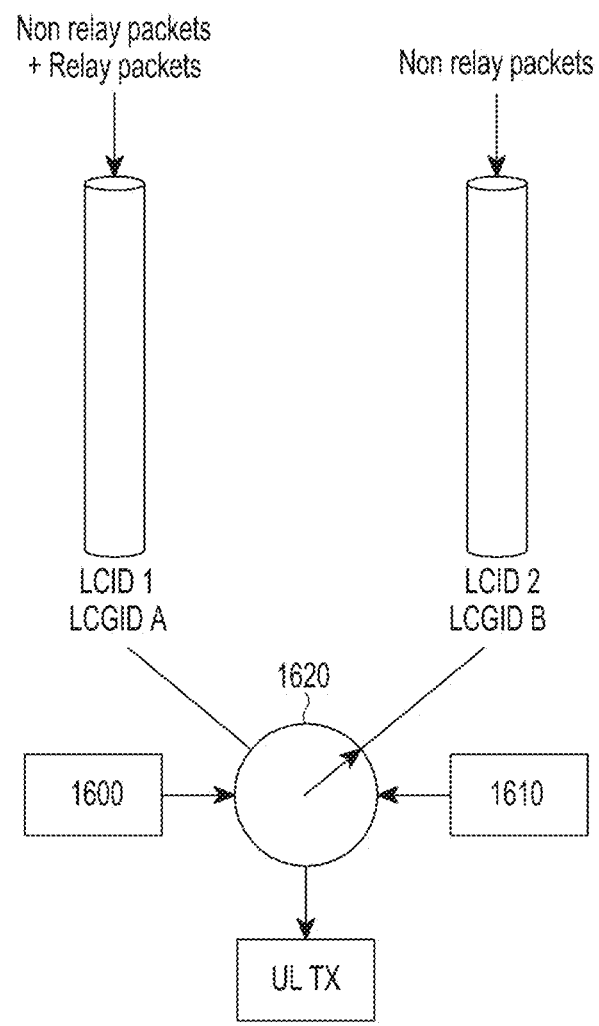
Figure 16C:
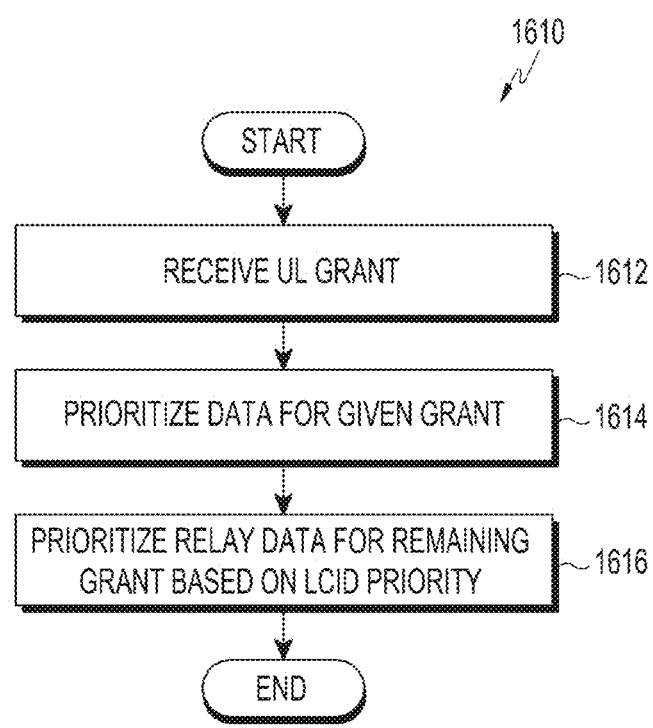

FIGS. 16A through 16C illustrate a prioritization policy in a relay UE according to another embodiment of the present disclosure.

Referring to FIG. 16A, the relay UE receives a UL grant in operation 1602.

The relay UE prioritizes data based on an LCID priority for the given grant in operation 1604.

The relay UE prioritizes relay data for the remaining grant in operation 1606.

Referring to FIG. 16C, the relay UE receives a UL grant in operation 1612.

The relay UE prioritizes relay data for the given grant in operation 1614. The relay UE prioritizes data based on an LCID priority for the remaining grant in operation 1616.

Referring to FIG. 16B, a reference numeral 1600 indicates the process of FIG. 16A, and a reference numeral 1610 indicate a process of FIG. 16C.

Referring to FIG. 16B, a grant is allocated to the relay UE on the assumption that several DRBs have already been configured. The relay UE may first allocate a grant to packets of the highest-priority LCID/logical channel group identifier (LCGID). Then, among the packets of the logical channel, relay packets may be prioritized over non-relay packets. If relay/non-relay packets should be prioritized according to another policy, the logical channel priority for the remaining grant may be considered later.

Sub-embodiment 3 of the third embodiment of the present disclosure: The same EPS bearer, but an additional DRB are dedicated to relay traffic.

There is one radio bearer for every EPS bearer. This method proposes generation of the additional DRB for relay traffic. One DRB or several DRBs may be generated for relay traffic.

Figure 17:
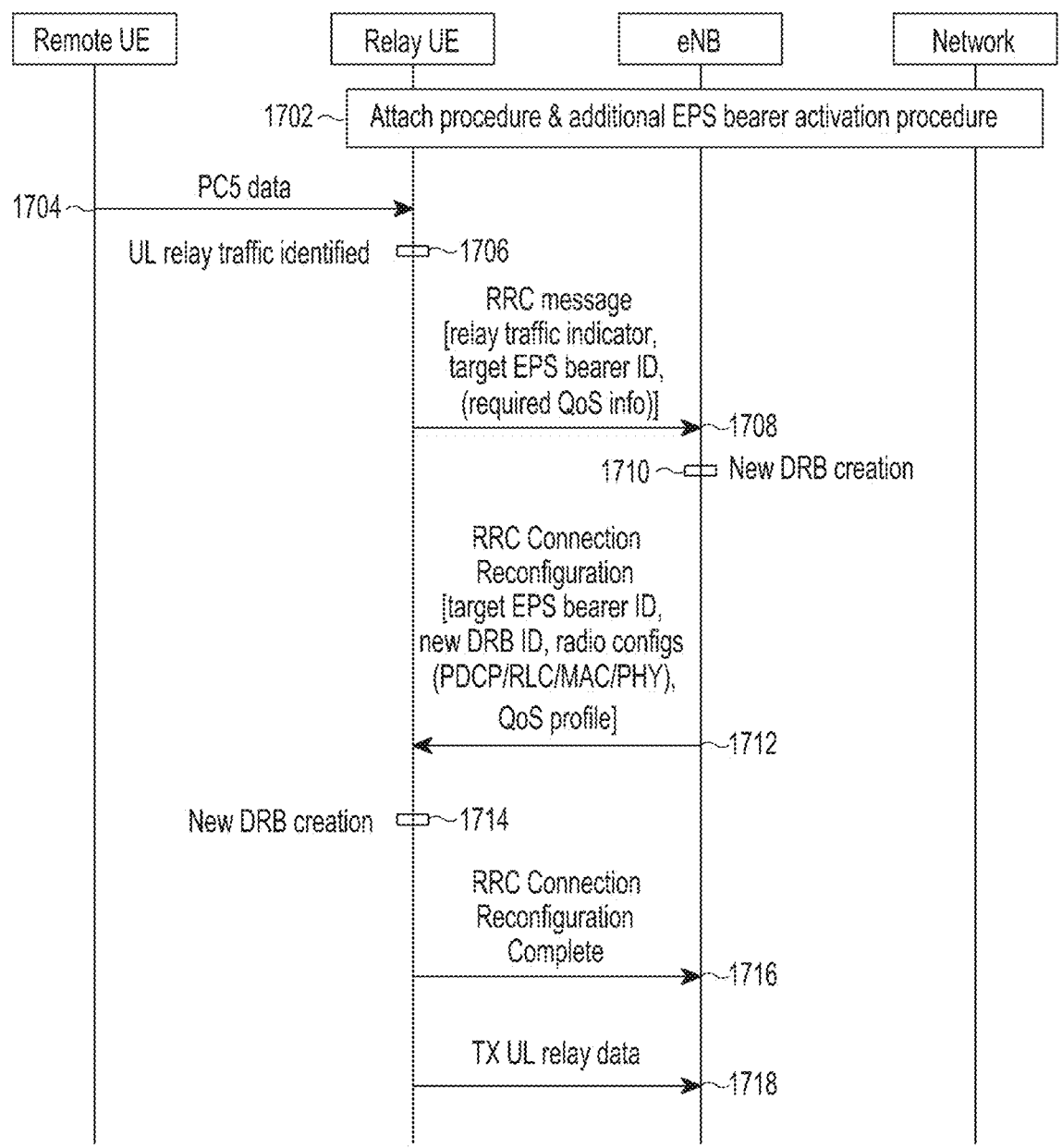
FIG. 17 is a flowchart illustrating operations when one data radio bearer (DRB) exists for relay traffic according to a sub embodiment 3 of the third embodiment of the present disclosure.

FIG. 17 is a flowchart illustrating operations when one DRB exists for relay traffic according to the sub embodiment 3 of the third embodiment of the present disclosure.

In operation 1702, an attach procedure and an additional EPS activation procedure are performed between the relay UE and the MME. A detailed description of operation 1702 will not be provided.

The relay UE receives PC-5 data from the remote UE in operation 1704. The relay UE then determines whether the traffic is UL relay traffic in operation 1706. The determining procedure is performed using a traffic indicator. The relay traffic indicator is assumed to be identified only for relay/non-relay distinguishment. The identified relay UE transmits an RRC message requesting DRB allocation, which includes a target EPS bearer and, if possible, required QoS information, to the eNB in operation 1708. The eNB then generates a new DRB in operation 1710. The eNB generates its own DRB without operating with the MME and another network entity and returns associated information such as a target EPS bearer ID, a DRB ID, radio configuration information, and a QoS profile to the relay UE in operation 1712. This information is used to generate the new DRB in the relay UE in operation 1714. The relay UE transmits an RRC connection reconfiguration (RRCConnectionRecon.) complete message to the eNB in operation 1716. The relay UE transmits relay data to the eNB by using the QoS profile in operation 1718.

Figure 18:
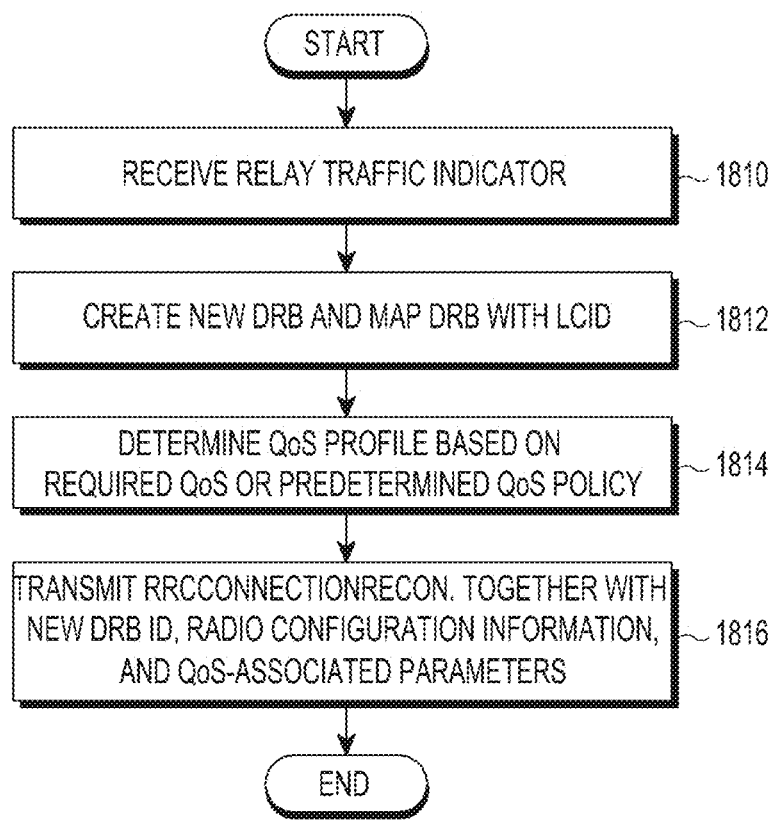
FIG. 18 is a flowchart illustrating operations of an eNB according to an embodiment of the present disclosure.

FIG. 18 is a flowchart illustrating operations of an eNB according to an embodiment of the present disclosure.

The eNB receives a relay traffic indicator from the relay UE in operation 1810. The eNB generates a new DRB based on the relay traffic indicator and maps the generated DRB with a new LCD in operation 1812. In operation 1814, the eNB determines a QoS profile based on a required QoS or a preset or predetermined QoS policy in the eNB. In operation 1816, the eNB transmits an RRC connection reconfiguration (RRCConnectionRecon.) message, together with a new DRB ID, a target EPS bearer ID, radio configuration information, and QoS-associated parameters, to the relay UE.

Figure 19:
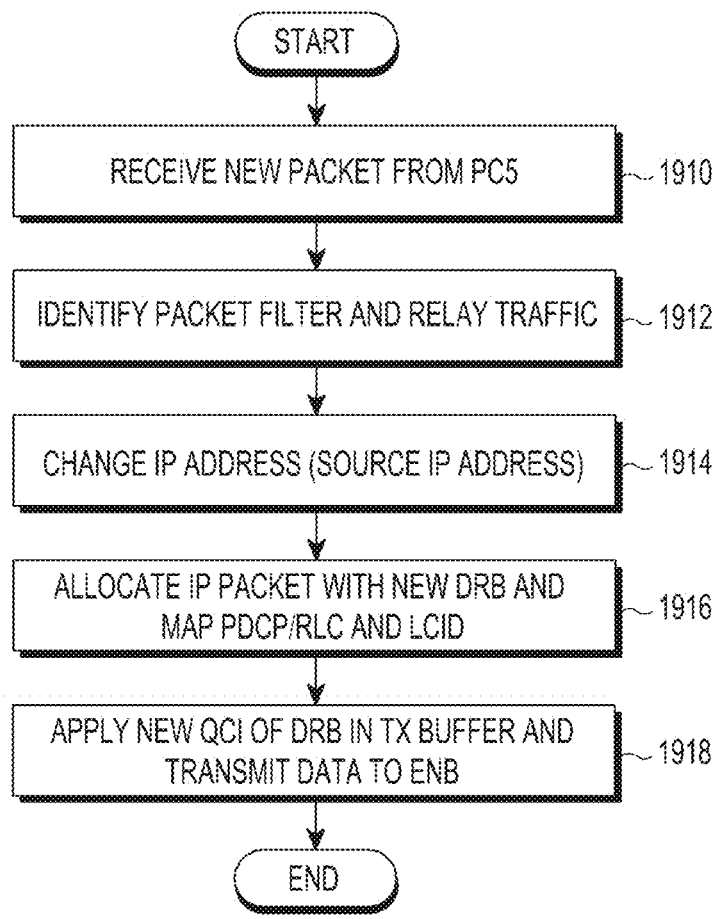
FIG. 19 is a flowchart illustrating operations of a relay UE according to an embodiment of the present disclosure.

FIG. 19 is a flowchart illustrating operations of a relay UE according to an embodiment of the present disclosure.

The relay UE receives a new packet from the remote UE in operation 1910. The relay UE filters the received packet and determines whether the filtered packet corresponds to a relay traffic based on the relay traffic indicator in operation 1912. If the packet corresponds to the relay traffic, the relay UE changes a source IP address to re-designate IP packets in operation 1914, and allocates the IP packet to a new DRB/PDCP/RLC entity and finally maps the MAC SDU to the LCD in operation 1916. Then, the relay UE applies the new DRB related to the QCI to the MAC SDU in the TX buffer of the relay UE and transmits data to the eNB in operation 1918.

Figure 20:
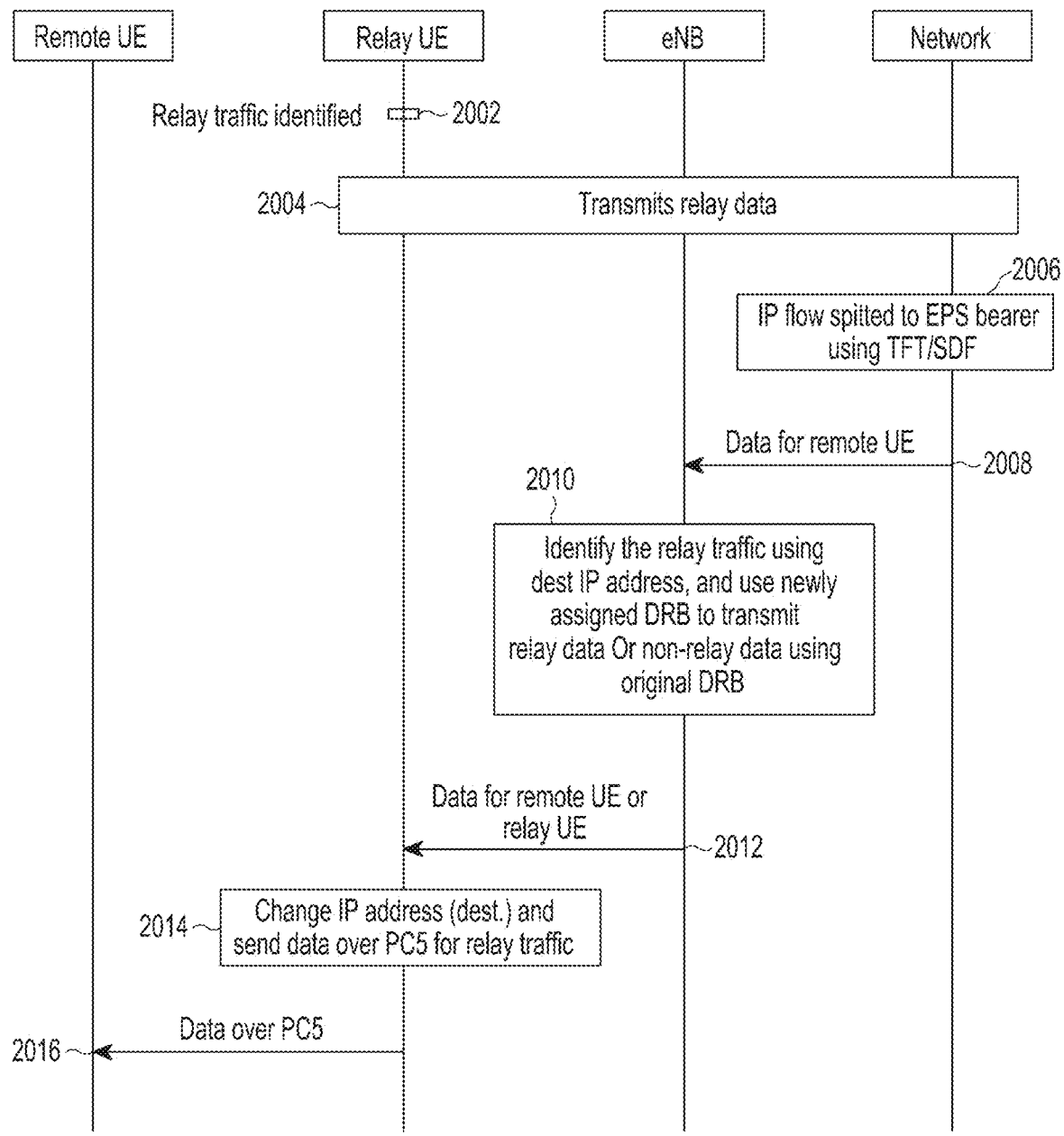
FIG. 20 is a flowchart illustrating operations when one DRB exists for relay traffic according to the sub embodiment 3 of the third embodiment of the present disclosure.

FIG. 20 is a flowchart illustrating operations when one DRB exists for relay traffic according to the sub embodiment 3 of the third embodiment of the present disclosure.

FIG. 17 shows a case with UL traffic, whereas FIG. 20 shows a case with DL traffic.

Referring to FIG. 20, in operation 2002, the relay UE determines whether the traffic is relay traffic. If the traffic is identified as relay traffic, the relay UE transmits relay data to the network through the eNB in operation 2004.

In operation 2006, the network classifies an IP flow as an EPS bearer in DL traffic to the remote UE according to a TFT or an SDF, and the EPS bearer should be a newly created dedicated EPS bearer in an embodiment of the present disclosure. The network transmits data to the eNB through the newly created dedicated EPS bearer in operation 2008.

The eNB receives data in operation 2008, and determines whether the traffic is relay traffic by using an IP destination address in operation 2010. If the traffic is intended for relaying, the eNB transmits the traffic to the relay UE by using the newly generated DRB in operation 2012. In this case, associated QoS will be used for radio-level operations. Otherwise, the eNB transmits data to the relay UE by using the original DRB. The relay UE changes an IP destination address in an IP layer in operation 2014, and transmits the data to the remote UE through PC-5 in operation 2016.

Figure 21:
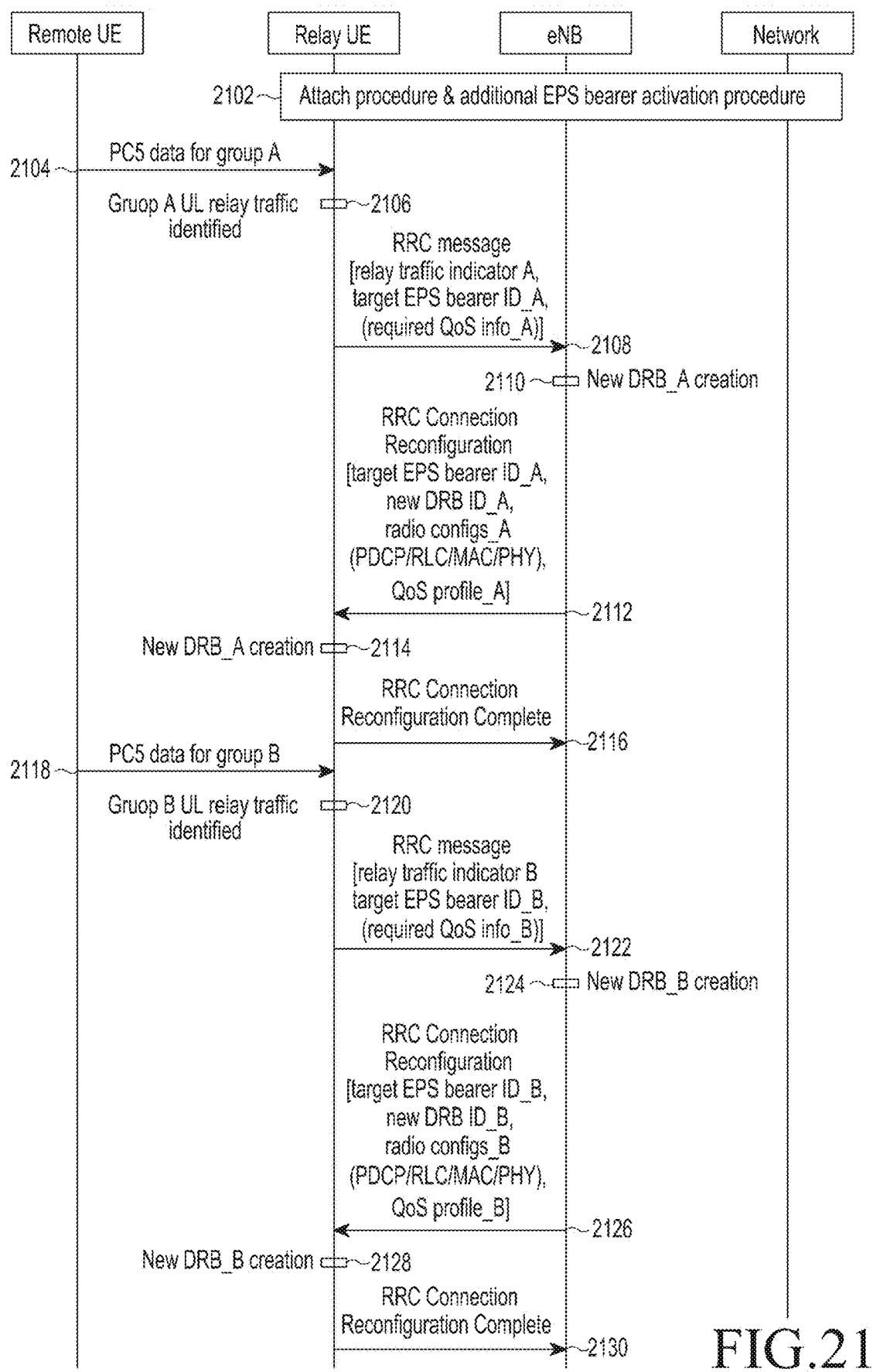
FIG. 21 is a flowchart illustrating operations when a plurality of DRBs exist for relay traffic according to the sub embodiment 3 of the third embodiment of the present disclosure.

FIG. 21 is a flowchart illustrating operations when a plurality of DRBs exist for relay traffic according to the sub embodiment 3 of the third embodiment of the present disclosure.

There may be several remote UEs having different priority parameters, but it is assumed that a group A and a group B exist and two DRBs exist.

In operation 2102, an attach procedure and an additional EPS activation procedure are performed between the relay UE and the MME. A detailed description of operation 2102 will not be provided.

The relay UE receives PC-5 data for the group A from the remote UE in operation 2104. The relay UE determines whether traffic is UL relay traffic for the group A based on the PC-5 data for the group A in operation 2106.

There may be several remote UEs having different priority parameters. In this case, several DRBs may separately process relay traffics of respective remote UEs. As shown in FIG. 21, various data may be received in the relay UE. In this case, it is assumed that the relay UE may identify a group of a packet received through PC-5.

In operation 2108, the relay UE generates an RRC message and transmits the generated RRC message to the eNB. The RRC message may include a relay group index (a relay traffic identifier, e.g., a relay traffic indicator A), a target EPS bearer ID, and as an option, QoS information required in the group A. The eNB then generates a new DRB for the group A in operation 2110. In operation 2120, the eNB transmits to the relay UE through the RRCConnectionRecon. message a target bearer ID for the group A, a newly generated DRB ID for the group A, radio configuration information for the group A, a QoS profile for the group A, and so forth.

In operation 2114, the relay UE generates a new DRB using information transmitted through the RCConnectionRecon. message. The relay UE transmits an RRC connection reconfiguration (RRCConnectionRecon.) complete message to the eNB in operation 2116.

The relay UE receives PC-5 data for the group B from the remote UE in operation 2108. The relay UE determines whether traffic is UL relay traffic for the group B based on the PC-5 data for the group B in operation 2120.

In operation 2122, the relay UE generates an RRC message and transmits the generated RRC message to the eNB. The RRC message may include a relay group index (a relay traffic identifier, e.g., a relay traffic indicator B), a target EPS bearer ID, and as an option, QoS information required in the group B. The eNB then generates a new DRB for the group B in operation 2124. In operation 2112, the eNB transmits to the relay UE through the RRCConnectionRecon. message a target bearer ID for the group B, a newly generated DRB ID for the group B, radio configuration information for the group B, a QoS profile for the group B, and so forth.

In operation 2128, the relay UE generates a new DRB using information transmitted through the RCConnectionRecon. message. The relay UE transmits an RRC connection reconfiguration (RRCConnectionRecon.) complete message to the eNB in operation 2130.

Figure 22:
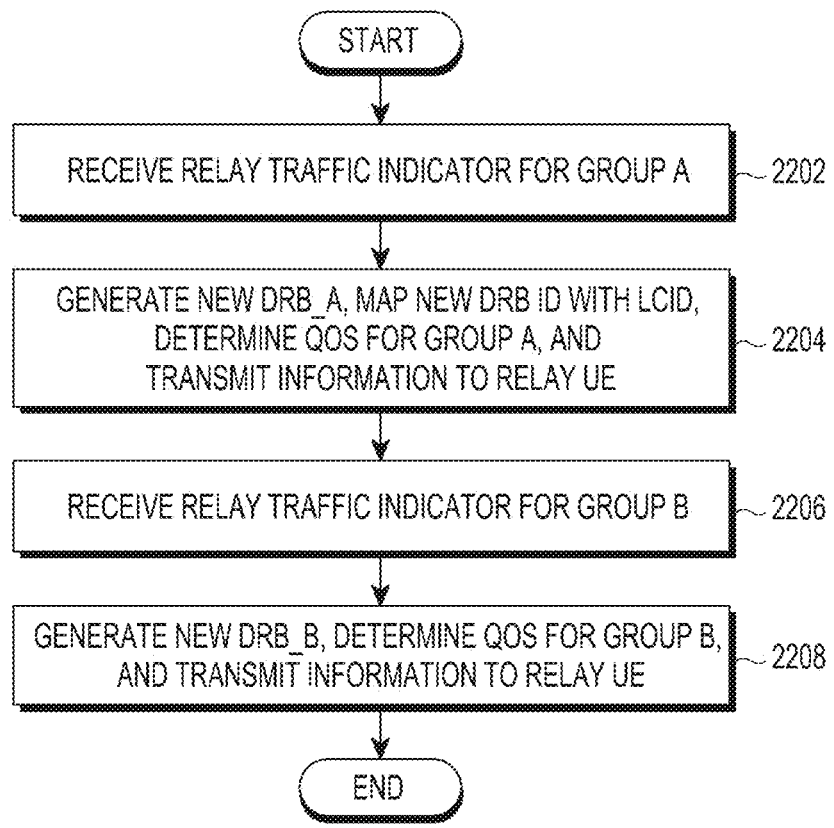
FIG. 22 is a flowchart illustrating operations of an eNB when there are a plurality of DRBs according to an embodiment of the present disclosure.

FIG. 22 is a flowchart illustrating operations of an eNB when there are a plurality of DRBs according to an embodiment of the present disclosure.

Herein, there are a plurality of DRBs, and for example, a group A and a group B are assumed to exist.

The eNB receives a relay traffic indicator for the group A in operation 2202 according to an embodiment of the present disclosure. The eNB generates a new DRB for the group A, maps a new DRB ID with an LCID, determines a QoS for the group A, and transmits the information to the relay UE in operation 2204. The eNB receives a relay traffic indicator for the group B in operation 2206. The eNB generates a new DRB for the group B, determines a QoS for the group B, and transmits the information to the relay UE in operation 2208.

Figure 23:
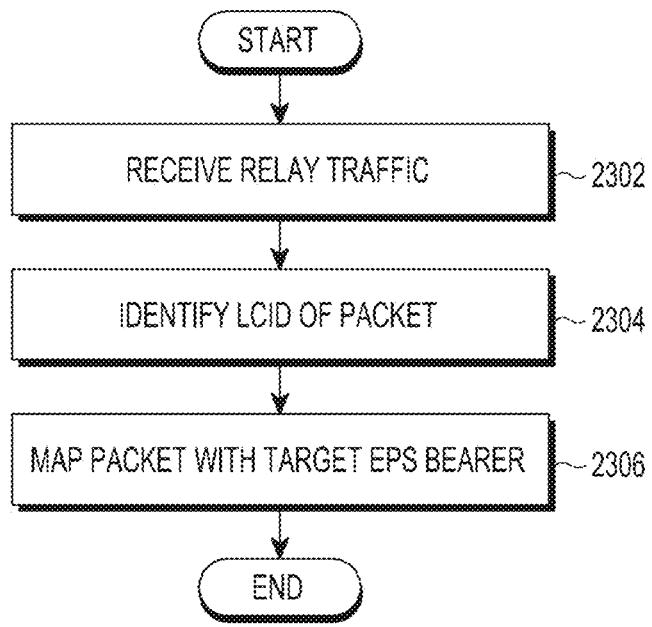
FIG. 23 is a flowchart illustrating operations of an eNB according to an embodiment of the present disclosure.

FIG. 23 is a flowchart illustrating operations of an eNB according to an embodiment of the present disclosure.

The eNB receives relay traffic from the relay UE in operation 2302. The eNB identifies an LCID of a packet in operation 2304. The eNB maps the packet with a target EPS bearer in operation 2306. The eNB transmits the packet through the network.

Figure 24:
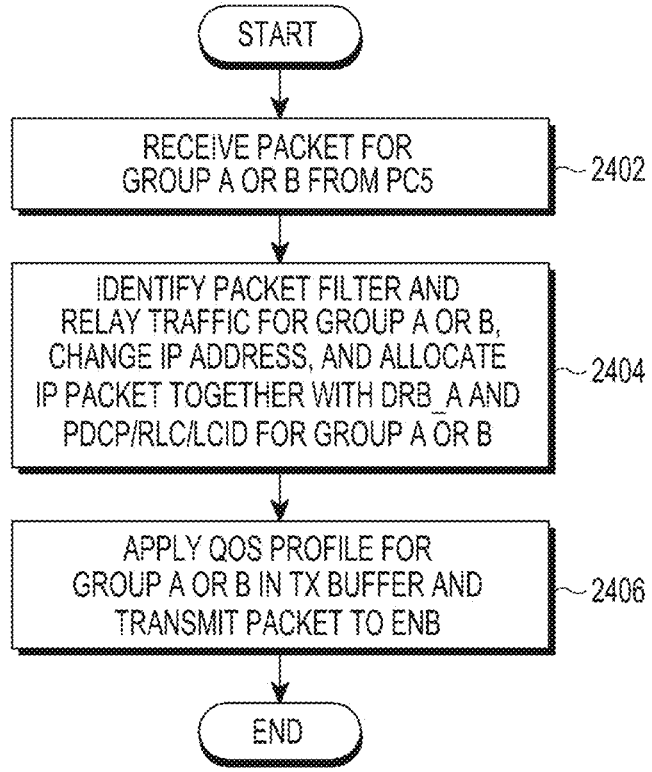
FIG. 24 is a flowchart illustrating operations of a relay UE according to an embodiment of the present disclosure.

FIG. 24 is a flowchart illustrating operations of a relay UE according to an embodiment of the present disclosure.

Herein, there are a plurality of DRBs, and for example, a group A and a group B are assumed to exist.

The relay UE receives a packet for the group A or the group B from the remote UE (PC-5) in operation 2402.

In operation 2404, the relay UE identifies a packet filter and relay traffic for the group A or B, changes an IP destination address in an IP layer, and allocates an IP packet together with DRB_A and PDCP/RLC/LCID for the group A or B.

In operation 2406, the relay UE applies a QoS profile for the group A or B in the TX buffer and transmits the packet to the eNB.

Figure 25:
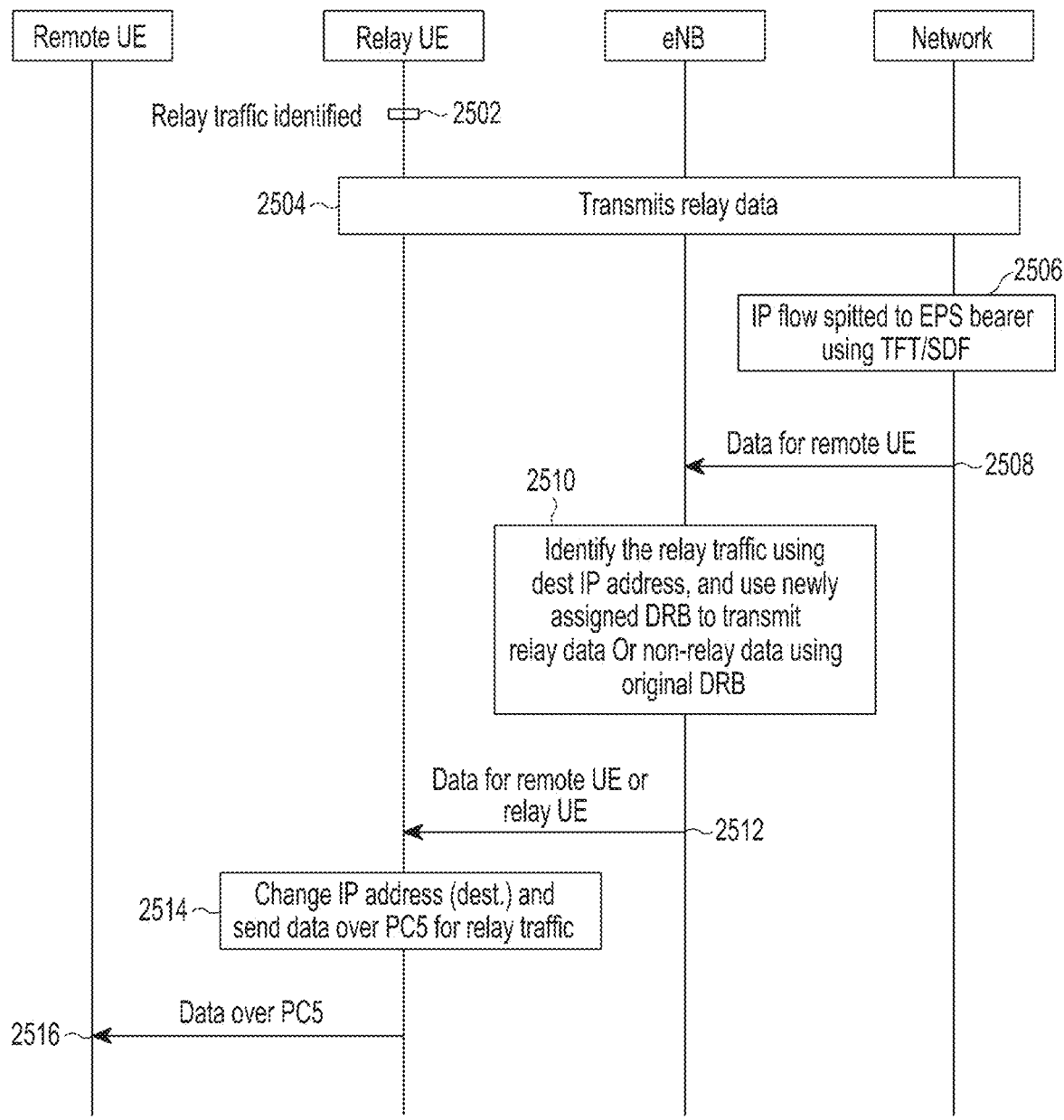
FIG. 25 is a flowchart illustrating operations when one DRB exists for DL relay traffic according to the sub embodiment 3 of the third embodiment of the present disclosure.

FIG. 25 is a flowchart illustrating operations when one DRB exists for DL relay traffic according to the sub embodiment 3 of the third embodiment of the present disclosure.

Referring to FIG. 25, in operation 2502, the relay UE determines whether the traffic is relay traffic. If the traffic is identified as relay traffic, the relay UE transmits relay data to the network through the eNB in operation 2504.

In operation 2506, the network classifies an IP flow as an EPS bearer in DL traffic to the remote UE according to a TFT or an SDF, and the EPS bearer should be a newly created dedicated EPS bearer in an embodiment of the present disclosure. The network transmits data to the eNB through the newly created dedicated EPS bearer in operation 2508.

The eNB receives data in operation 2508, and determines whether the traffic is relay traffic by using an IP destination address in operation 2510. If the traffic is intended for relaying, the eNB transmits the traffic to the relay UE by using the newly generated DRB in operation 2512. In this case, associated QoS will be used for radio-level operations. Otherwise, the eNB transmits data to the relay UE by using the original DRB. The relay UE changes an IP destination address in an IP layer in operation 2514, and transmits the data to the remote UE through PC-5 in operation 2516.

Figure 26:
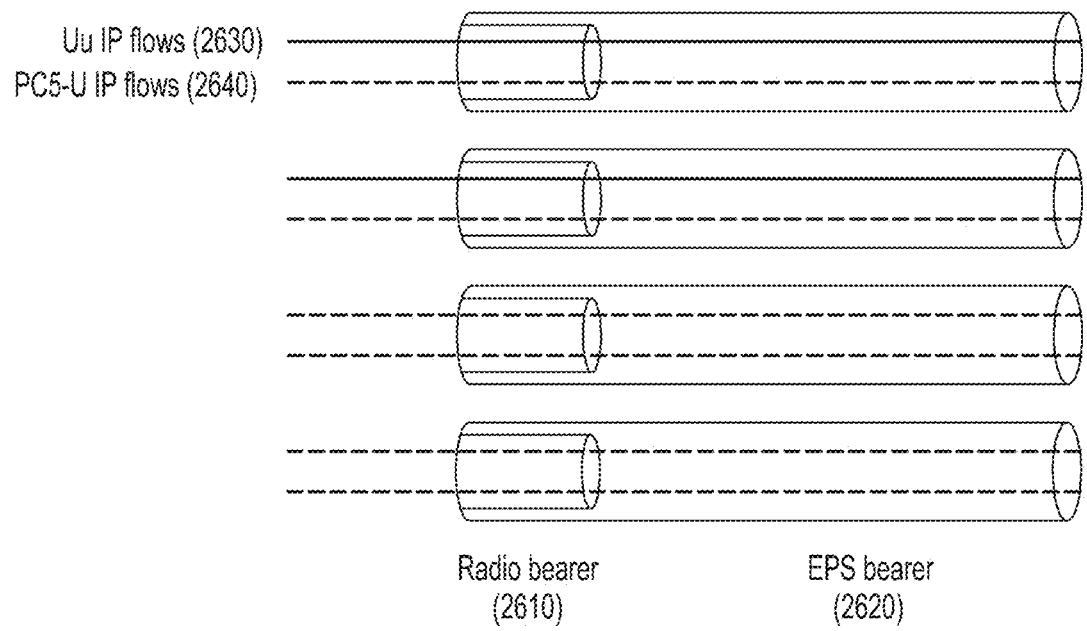
FIG. 26 illustrates a structure of a radio bearer and an evolved packet system (EPS) bearer according to an embodiment of the present disclosure.

FIG. 26 illustrates a structure of a radio bearer and an EPS bearer according to an embodiment of the present disclosure.

FIG. 26 is intended to identify relay traffic and Uu link traffic as Method 1. On the other hand, an EPS bearer 2620 and its corresponding DRB 2610 may be used for both Uu traffic 2630 and relay traffic 2640. FIG. 26 shows that there is no separation between relay traffic and Uu traffic in relation to an EPS bearer and a DRB. After an UL IP packet is received by the relay UE, 5-tuples are given such as a source IP address, a destination IP address, a source port number, a destination port number, and a transport. By using the source port number in a packet received from the relay UE, QoS-related traffic that is not related to relay or Uu is used to generate the EPS bearer 2620. Thus, for the same source port and associated QoS, the Uu traffic and the relay traffic use the same EPS bearer and DRB. In this case, a packet priority of relay traffic is not used for prioritization in the EPS.

Figure 27:
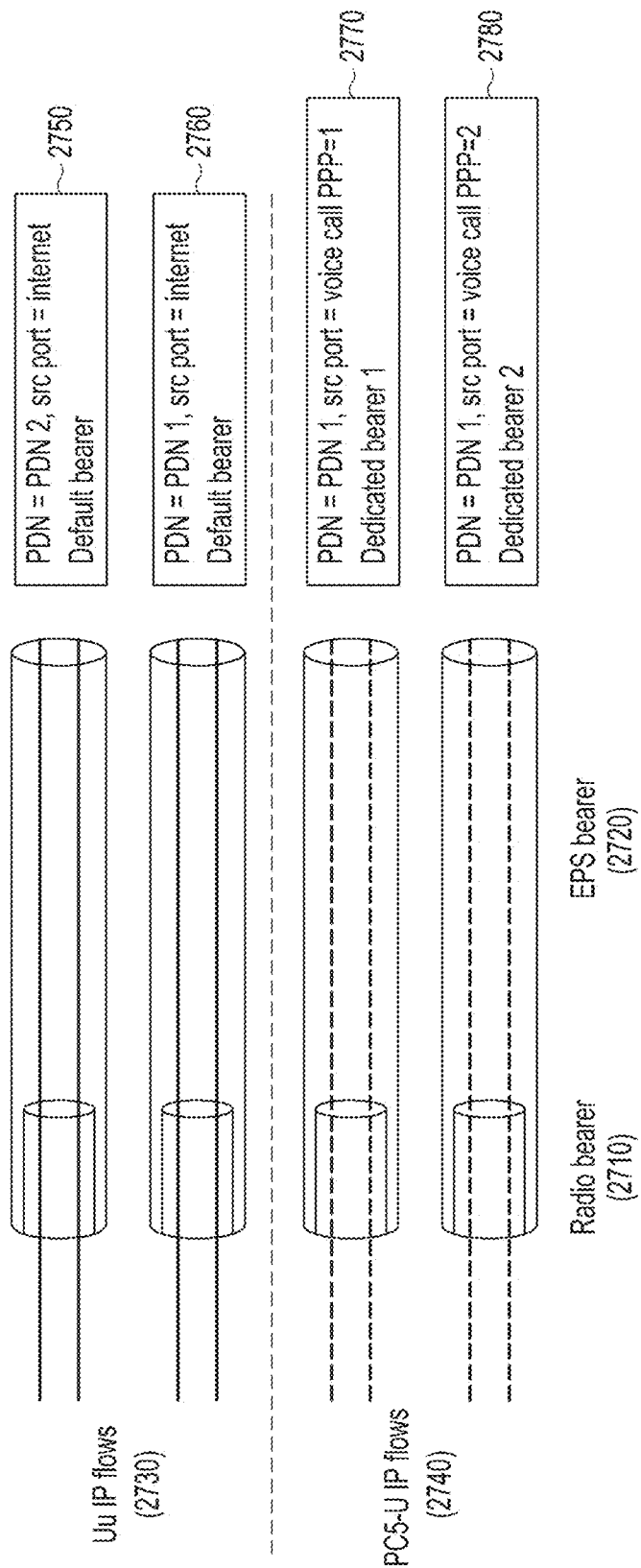
FIG. 27 illustrates a structure of a radio bearer and an EPS bearer according to an embodiment of the present disclosure.

FIG. 27 illustrates a structure of a radio bearer and an EPS bearer according to an embodiment of the present disclosure.

When an EPS bearer 2720 is used, even in the same EPS bearer, prioritization may be performed depending on a DRB 2710. That is, in one EPS bearer, a packet-level priority may be used for UL transmission ordering in a UL TX buffer. Logics of FIGS. 16A, 16B, and 16C may be used. That is, if a packet priority is given for the same EPS bearer in the UL TX buffer, i) relay traffic may be prioritized or ii) Uu traffic may be prioritized. In both cases, prioritization may be performed by applying a given packet priority in relay traffic.

Relay traffic 2740 is identified in an EPS bearer level. Uu traffics 2730 have their own PES bearers. Each EPS bearer may be created for each PDN and source port number. As in 2750, 2760, 2770, and 2780, legacy rules (for the same PDN and source port, packets are classified as the same EPS bearer) are used. In addition, to create different radio bearers in the same EPS bearer, a priority for each packet may be used.

Figure 28:
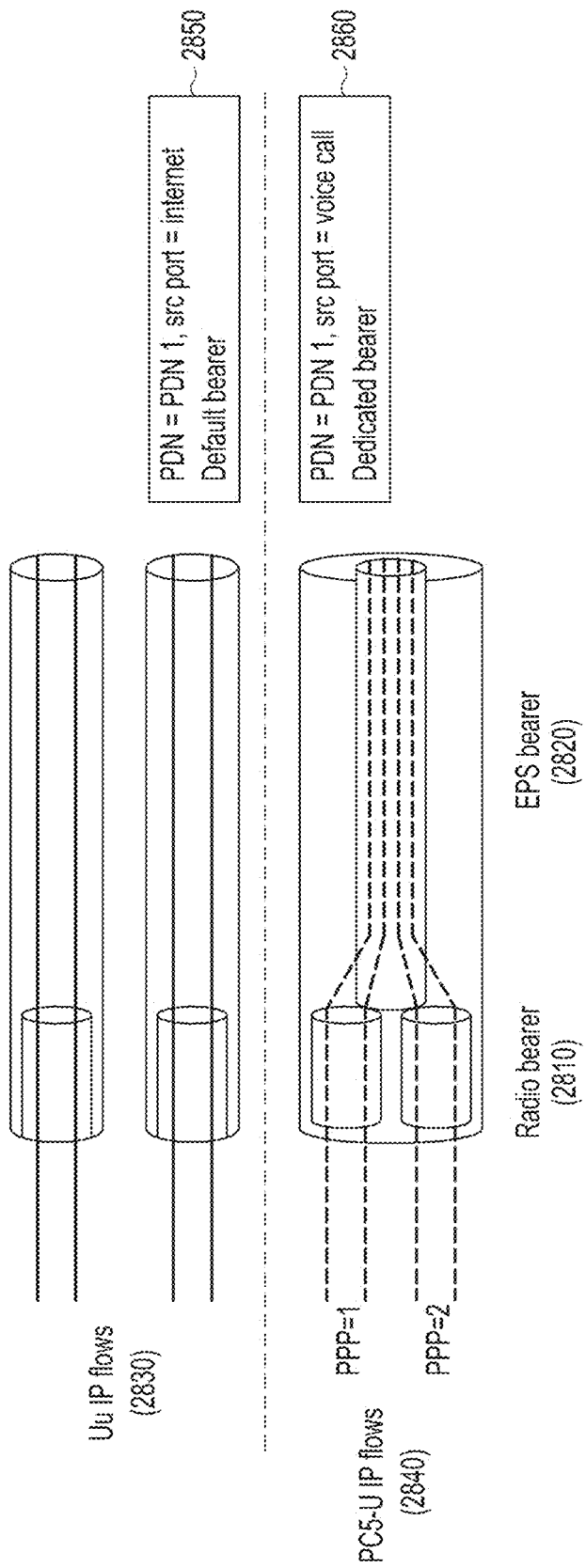
FIG. 28 illustrates a structure of a radio bearer and an EPS bearer according to an embodiment of the present disclosure.

FIG. 28 illustrates a structure of a radio bearer and an EPS bearer according to an embodiment of the present disclosure.

FIG. 28 is the same as a case of FIG. 27, but a priority per packet may generate another DRB 2810 in one EPS bearer 2820. In FIG. 28, Uu traffic 2830 and relay traffic 2840 are classified depending on an EPS bearer. A plurality of EPS bearers may be divided by a 5-tuple method. For relay traffic, a priority per packet may be used to generate another DRB in an EPS bearer. The another DRB may be processed by an eNB as data having a different priority like LCP.

As in 2850 and 2860, legacy rules (for the same PDN and a different source port, packets are classified by the same EPS bearer) are used.

The above modified examples of Uu traffic and relay traffic bearer mapping may use any one of Methods 1 through 3 in a generation call flow.

Figure 29:
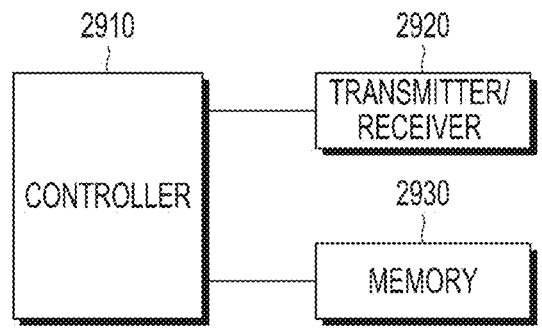
FIG. 29 is a block diagram of a remote UE according to an embodiment of the present disclosure.

FIG. 29 is a block diagram of a remote UE according to an embodiment of the present disclosure.

Referring to FIG. 29, the remote UE may include a controller 2910, a transmitter/receiver 2920, and a memory 2930.

The transmitter/receiver 2920 may include a transmission module and a reception module for transmitting and receiving data to and from the relay UE according to an embodiment of the present disclosure.

The controller 2910 controls operations of the remote UE to execute the operations according to the first through third embodiments of the present disclosure. A detailed description thereof will not be provided.

The memory 2930 may store a program for processing and controlling of the controller 2910, and performs a function for temporarily storing input/output data.

Figure 30:
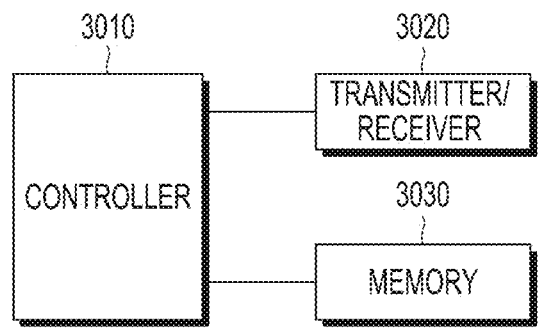
FIG. 30 is a block diagram of a relay UE according to an embodiment of the present disclosure.

FIG. 30 is a block diagram of a relay UE according to an embodiment of the present disclosure.

Referring to FIG. 30, the relay UE may include a controller 3010, a transmitter/receiver 3020, and a memory 3030.

The transmitter/receiver 3020 may include a transmission module and a reception module for transmitting and receiving data to and from the relay UE according to an embodiment of the present disclosure.

The controller 3010 controls operations of the relay UE to execute the operations according to the first through third embodiments of the present disclosure. A detailed description thereof will not be provided.

The memory 3030 may store a program for processing and controlling of the controller 3010, and performs a function for temporarily storing input/output data.

Figure 31:
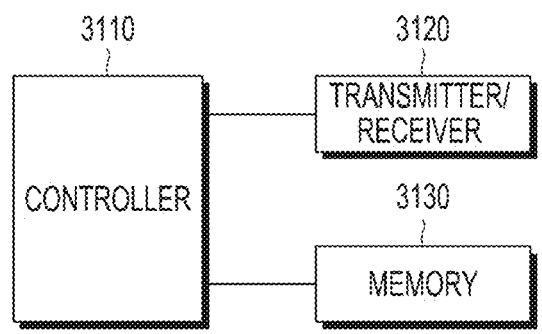
FIG. 31 is a block diagram of an eNB according to an embodiment of the present disclosure.

FIG. 31 is a block diagram of an eNB according to an embodiment of the present disclosure.

Referring to FIG. 31, the eNB may include a controller 3110, a transmitter/receiver 3120, and a memory 3130.

The transmitter/receiver 3120 may include a transmission module and a reception module for transmitting and receiving data to and from the relay UE according to an embodiment of the present disclosure.

The controller 3110 controls operations of the eNB to execute the operations according to the first through third embodiments of the present disclosure. A detailed description thereof will not be provided.

The memory 2930 may store a program for processing and controlling of the controller 2910, and performs a function for temporarily storing input/output data (e.g., information about an object or a person).

The method and apparatus for controlling relay traffic in a wireless communication system supporting D2D communication according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method for controlling relay traffic in a wireless communication system supporting D2D communication according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

In addition, the apparatus for controlling relay traffic in a wireless communication system supporting D2D communication according to the embodiment of the present disclosure may receive the program from a program providing device that is connected thereto in a wired or wireless manner, and may store the received program. The program providing device may include a memory for storing a program including instructions for instructing the program processing device to execute a preset method for controlling relay traffic in a wireless communication system supporting D2D communication, information necessary for the method, a communication unit for performing wired or wireless communication with the program processing device, and a controller for transmitting a corresponding program to the program processing device at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method in a wireless communication system supporting device-to-device (D2D) communication, the method comprising:

transmitting, to a base station (BS), a buffer status report (BSR) request message for a uplink (UL) grant;

receiving, from the BS, the UL grant;

prioritizing a plurality of packets in a transmission buffer based on a logical channel identifier (LCD) priority for the UL grant;

determining whether at least one packet among a plurality of packets of a same LCID comprises a relay traffic indicator indicating that the at least one packet is a relay traffic, wherein the relay traffic is received from a remote UE on D2D communication;

prioritizing the at least one packet over other packets of the same LCID in response to determining that the at least one packet comprises the relay traffic indicator; and transmitting, to the BS, the plurality of the packets in the transmission buffer using the UL grant based on results of the prioritizing, wherein the LCID priority is determined based on a port number of the plurality of packets in the transmission buffer.

2. The method of claim 1, further comprising:

mapping the at least one packet of the relay traffic to an evolved packet system (EPS) bearer.

3. An apparatus in a wireless communication system supporting device-to-device (D2D) communication, the apparatus comprising:

a transceiver; and a controller configured to:
control the transceiver to transmit, to a base station (BS), a buffer status report (BSR) request message for an uplink (UL) grant,
control the transceiver to receive, from the BS, the UL grant,
prioritize a plurality of packets in a transmission buffer based on a logical channel identifier (LCID) priority for the UL grant,
determine whether at least one packet among a plurality of packets of a same LCID comprises a relay traffic indicator indicating that the at least one packet is a relay traffic, wherein the relay traffic is received from a remote UE,
prioritize the at least one packet over other packets of the same LCID in response to determining that the at least one packet comprises the relay traffic indicator, and
control the transceiver to transmit, to the BS, the plurality of the packets in the transmission buffer using the UL grant based on results of the prioritizing,
wherein the LCID priority is determined based on a port number of the plurality of packets in the transmission buffer.

4. The apparatus of claim 3, wherein the controller is further configured to map the at least one packet of the relay traffic to an evolved packet system (EPS) bearer.

\* \* \* \* \*